United States Patent [19]

Maruichi et al.

[11] Patent Number: 4,559,567
[45] Date of Patent: Dec. 17, 1985

[54] APPARATUS FOR RECORDING AND/OR REPRODUCING VIDEO AND AUDIO SIGNALS

[75] Inventors: Takanori Maruichi, Chiba; Shoji Hagita, Kanagawa, both of Japan

[73] Assignee: Sony Corporation, Tokyo, Japan

[21] Appl. No.: 457,747

[22] Filed: Jan. 13, 1983

[30] Foreign Application Priority Data

Jan. 16, 1982 [JP] Japan .................................. 57-5264

[51] Int. Cl.$^4$ ............................................ H04N 5/783
[52] U.S. Cl. .................................. 360/10.3; 360/19.1;
360/64; 360/38.1; 358/343; 358/336; 358/340
[58] Field of Search ........................ 360/10.3, 19.1, 20,
360/64, 38.1, 33.1, 21; 358/336, 340, 335, 343

[56] References Cited

U.S. PATENT DOCUMENTS

| | | | |
|---|---|---|---|
| 3,662,101 | 5/1972 | Segerstrom | 360/10.3 |
| 3,989,893 | 11/1976 | Eisema | 358/336 |
| 4,007,482 | 2/1977 | Amari | 358/328 |
| 4,007,484 | 2/1977 | Amari | 358/328 |
| 4,189,745 | 2/1980 | Ushio | 358/340 |
| 4,403,262 | 9/1983 | Ito | 360/19.1 |
| 4,464,684 | 8/1984 | Kluth | 358/343 |

*Primary Examiner*—Alan Faber
*Attorney, Agent, or Firm*—Lewis H. Eslinger; Alvin Sinderbrand

[57] ABSTRACT

For providing high-quality reproduction of audio in a video tape recorder (VTR), the video and audio signals are recorded as first and second mixed signals in successive alternately arranged adjacent first and second parallel record tracks, respectively, extending obliquely on a magnetic record tape, with the first and second mixed signals being comprised of respective carriers of different frequencies which are modulated by an audio signal to constitute respective FM audio signals mixed with a video signal. In a normal reproducing mode of the VTR, in which the tape is advanced at a normal speed corresponding to that used for recording, magnetic heads scan substantially along the adjacent first and second record tracks in succession for alternately reproducing the first and second mixed signals therefrom, the FM audio signals are separated from the reproduced mixed signals and then are demodulated for obtaining therefrom respective alternately reproduced portions of the audio signal, and the alternately reproduced portions are sequentially combined to reconstitute the audio signal therefrom. In another reproducing mode in which the tape is advanced at other than its normal speed, the heads scan imperfectly along the record tracks so that the mixed signals are reproduced therefrom with noise particularly when the heads are situated adjacent end portions of the tracks being imperfectly scanned, and a noise compensating circuit is operative, in that other reproducing mode, for removing the noise from the reconstituted audio signal.

48 Claims, 33 Drawing Figures

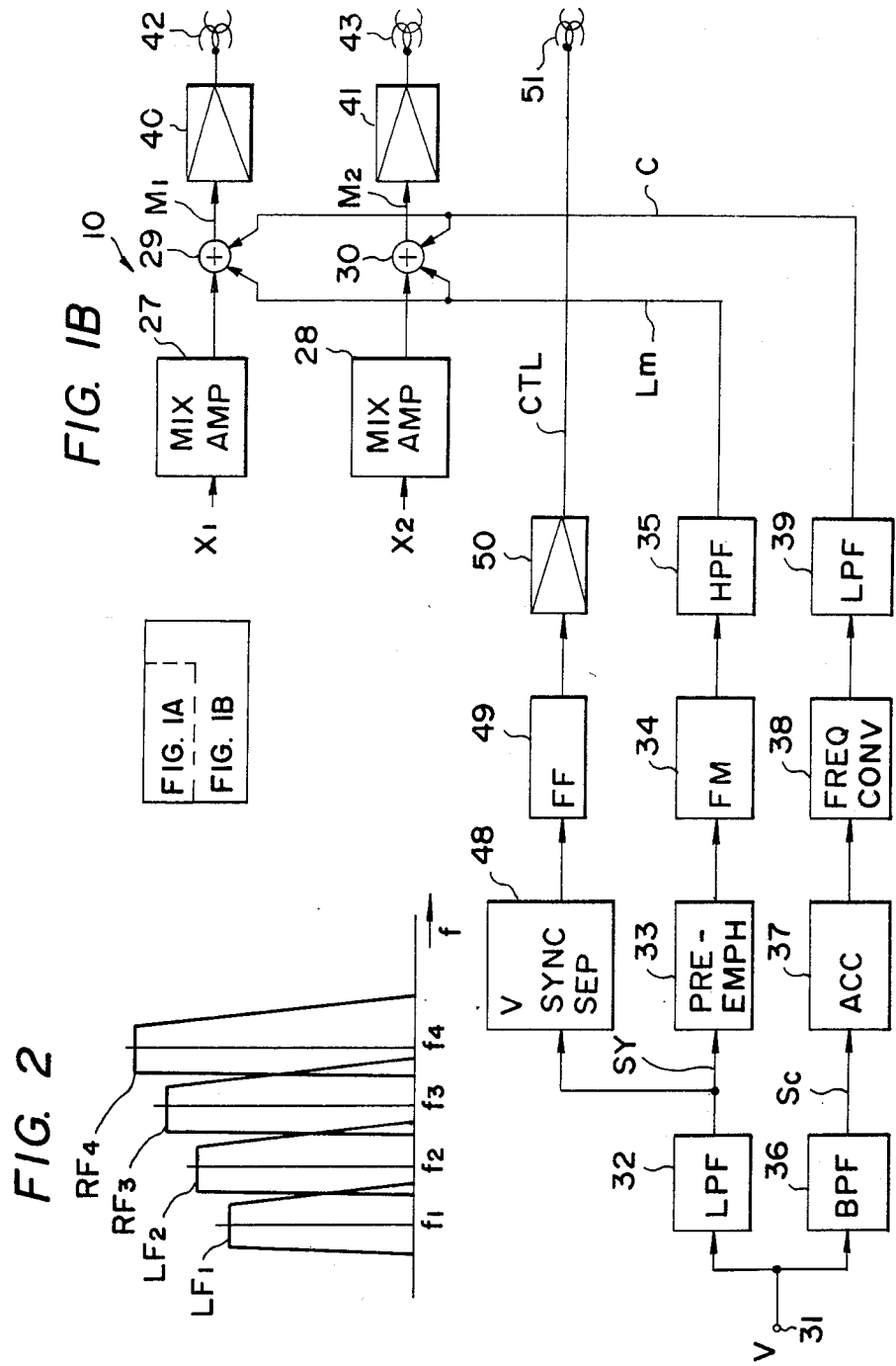

FIG. 6
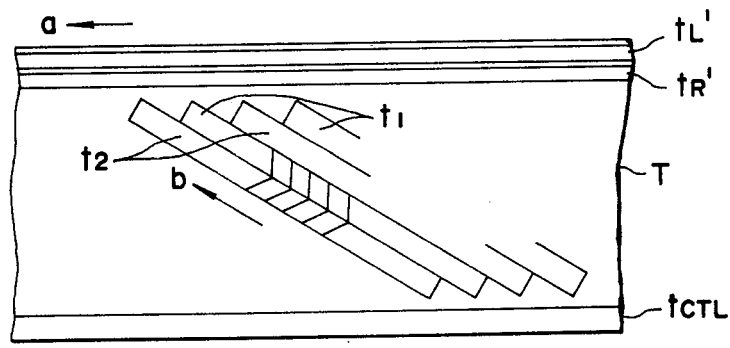
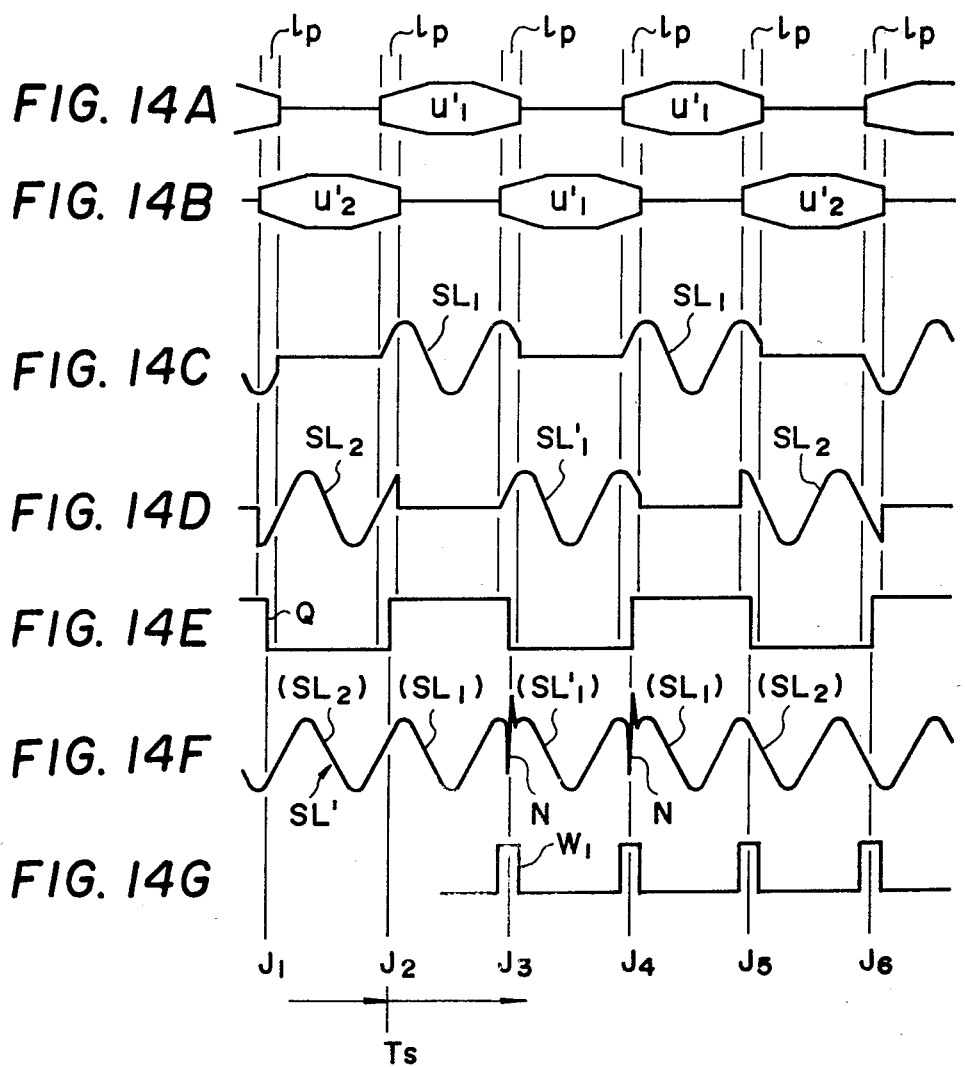

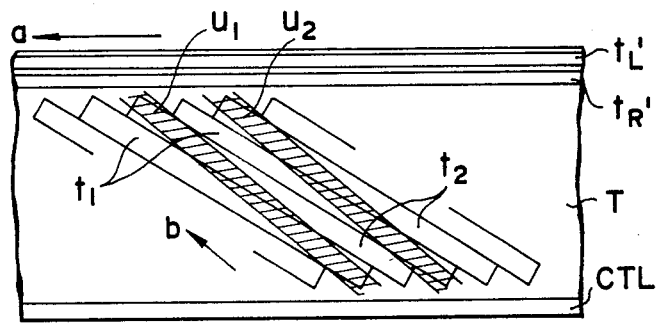
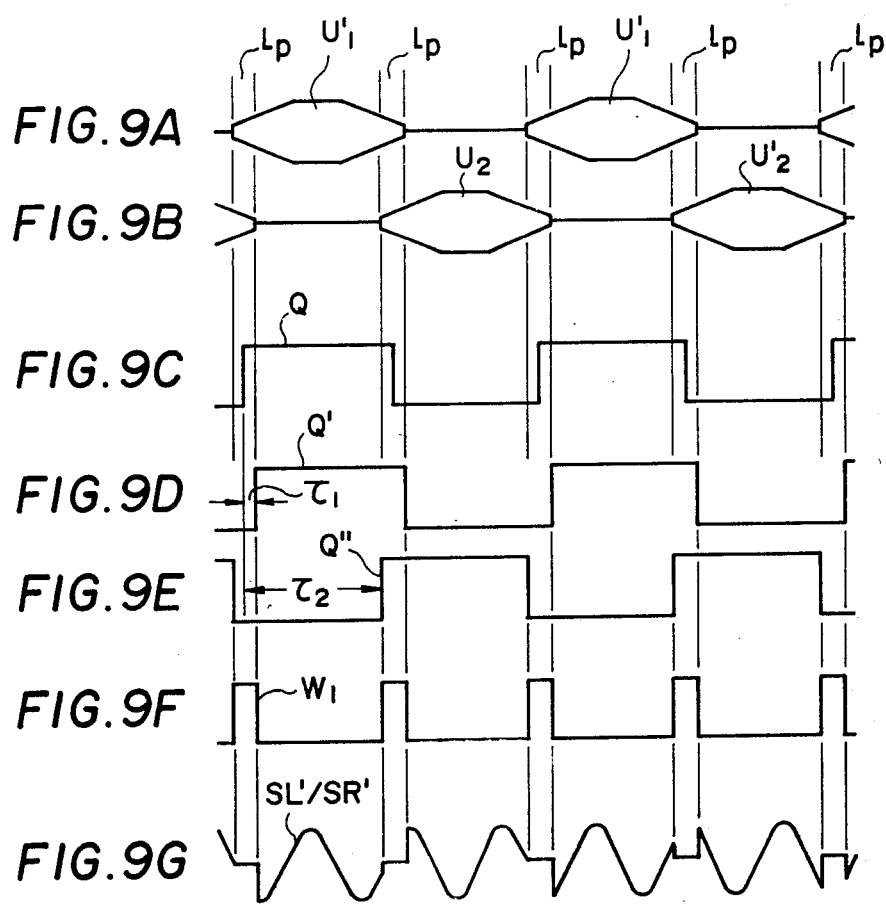

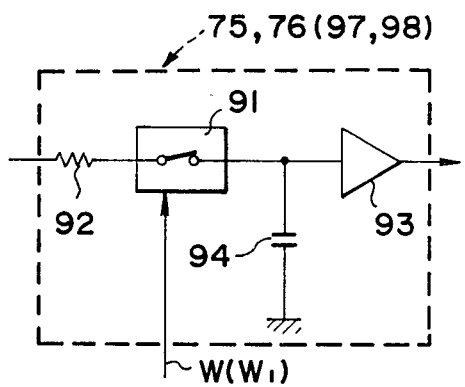
FIG. 10A
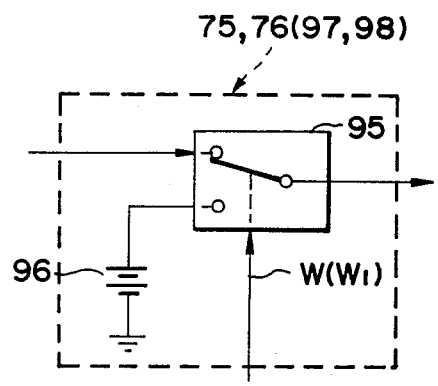
FIG. 10B
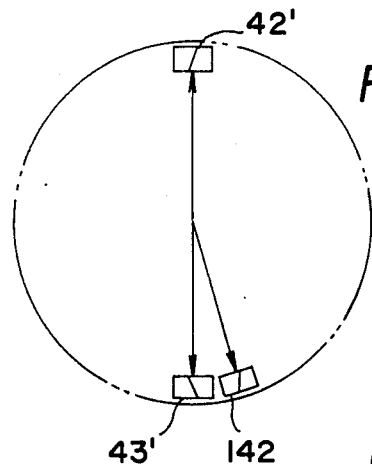
FIG. 12
FIG. 13
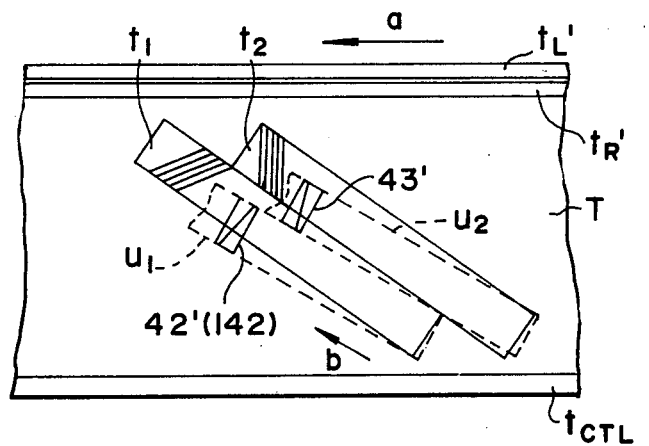

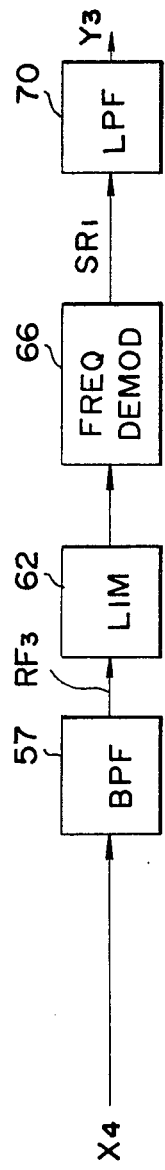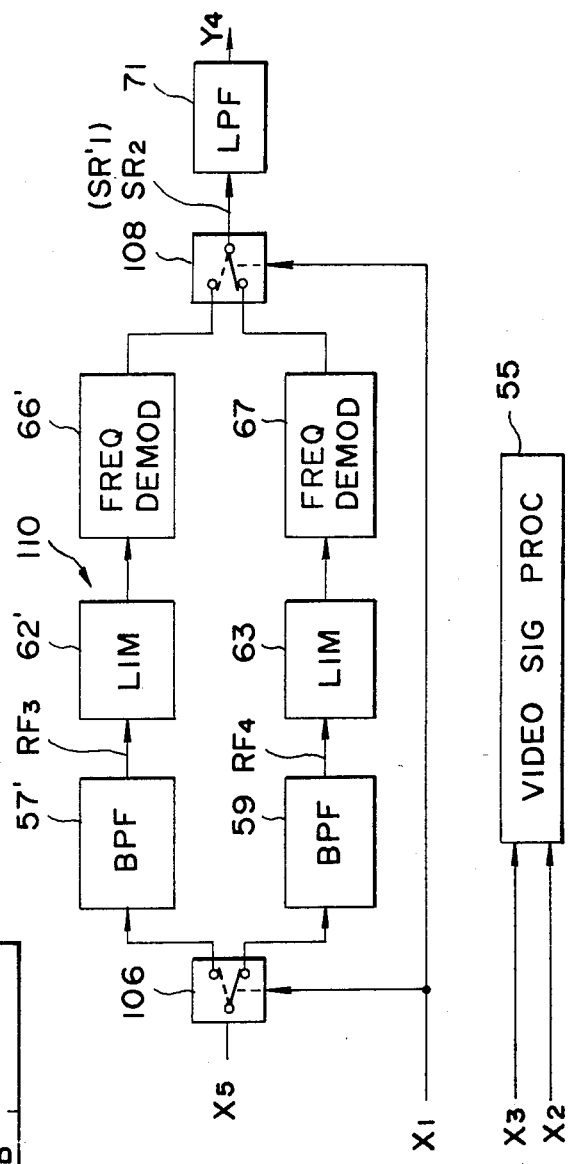
FIG. 11B

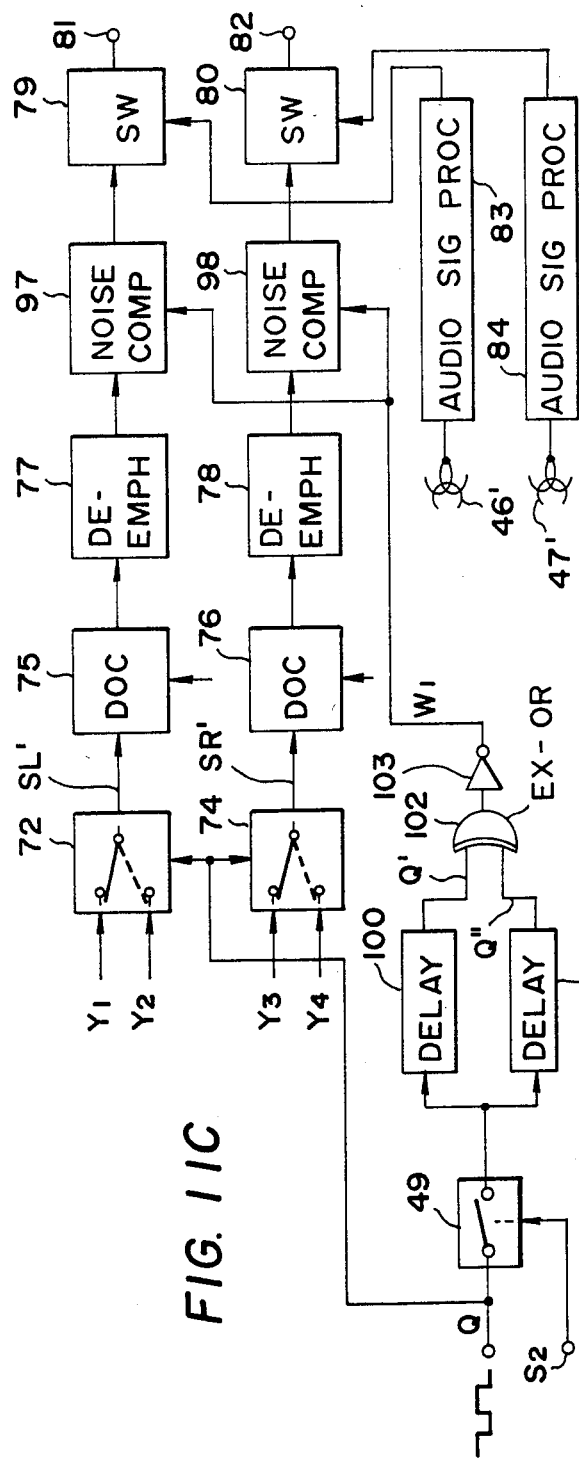
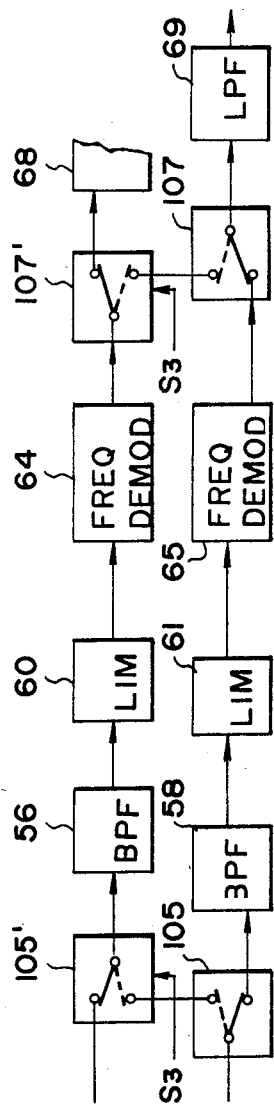
FIG. 11C
FIG. 11D

APPARATUS FOR RECORDING AND/OR REPRODUCING VIDEO AND AUDIO SIGNALS

BACKGROUND OF THE INVENTION

1. Field of the Invention

This invention relates generally to an apparatus for magnetically recording and/or reproducing video and audio signals, such as may constitute a television signal, and more particularly is directed to improvements in the reproducing of the audio signal in such an apparatus.

2. Description of the Prior Art

In video tape recorders (VTRs) according to the prior art for recording a color television signal on a magnetic tape, the chrominance and luminance signal components which constitute the color video signal are separated, and the chrominance signal component has its carrier frequency converted to a relatively low value, while the luminance component frequency modulates a relatively high frequency carrier, whereupon the frequency-converted chrominance signal component and the high side band of the frequency-modulated luminance signal component (hereinafter simply referred to as the "FM modulated luminance signal component") are mixed or combined to form a composite color video signal which is recorded on a magnetic tape in successive, parallel record tracks extending obliquely or slanted in respect to the longitudinal or running direction of the magnetic tape. In such existing system for recording a color television signal, the audio signal thereof is recorded on the magnetic tape in record tracks which extend in the longitudinal direction, that is, the running direction of the magnetic tape, and are hereinafter referred to simply as "audio tracks".

In the above described recording system of the prior art, the oblique or slant tracks which are skewed relative to the tape and in which the composite color video signal, that is, the frequency-converted chrominance signal component and the frequency-modulated luminance signal component, is recorded, are formed by first and second substantially diametrically opposed rotary magnetic heads both supplied with the composite color video signal and alternately scanning the magnetic tape along a path at an angle to the longitudinal direction in which the tape is transported. In order to increase the recording density of the color video signal on the tape and thereby increase the duration of the recording, it has been known to restrict the speed at which the magnetic tape is transported so that the successive slant tracks scanned by the rotary magnetic heads will be closely or immediately adjacent to each other, that is, so that spaces or so-called guard bands between the adjacent slant tracks will be eliminated. However, in such case, the problem of "cross talk" arises in the reproducing or playback mode of the apparatus. In other words, during reproducing or playback, a transducer or head scanning one of the slant tracks for reproducing the composite color video signal recorded therein will also pick up or reproduce signals or cross talk from the next adjacent tracks.

The problem of cross talk has been substantially solved, at least in respect to the relatively high frequency frequency-modulated luminance signal component of the recorded composite color video signal, by providing the first and second rotary magnetic heads with different azimuth angles so that the composite color video signal will be recorded in each slant track by means of a magnetic head having an azimuth angle different from the azimuth angle of the head with which the composite color video signal is recorded in the next adjacent tracks. Thereafter, during reproducing or playback, each slant track is scanned by a rotary magnetic head having the corresponding azimuth angle with the result that a substantial azimuth loss is experienced as to the relatively high frequency components of the cross talk from the adjacent tracks. Thus, the cross talk in respect to the frequency-modulated luminance signal component is substantially suppressed.

However, the azimuth loss effect is rather poor in respect to the low frequency band of the cross talk, for example, in respect to the frequency-converted chrominance signal component, so that other measures need to be taken for eliminating or minimizing the low-frequency component of the cross talk. For example, as disclosed in detail in U.S. Pat. No. 4,007,482, issued Feb. 8, 1977, and having a common assignee herewith, cross talk in respect to the frequency-converted chrominance signal situated in a relatively low frequency band is substantially eliminated by recording the chrominance signal component with different first and second carriers in the adjacent tracks, respectively. Such first and second carriers modulated by the chrominance signal component recorded in adjacent tracks, respectively, may be distinguished from each other by their respective frequency and/or polarity characteristics so that, upon reproduction of the signal recorded in a particular track, the low frequency bank of the cross talk from the tracks next adjacent thereto can be conveniently suppressed or eliminated by reason of the different frequency and/or polarity or phase characteristics of the respective carriers.

More specifically, as disclosed in the above-identified patent, the chrominance signal component of the color video signal to be recorded may be frequency-converted so as to selectively produce first and second frequency converted signals which, when considered instantaneously, have the same carrier frequency about which differ from each other in their phase or polarity characteristics. In this case, each of the line areas or increments of one track may have recorded therein a frequency-converted chrominance signal component with a carrier of constant polarity, while, in the next adjacent tracks the carrier frequency-converted chrominance signal component recorded therein reverses its polarity for successive line intervals. Such pattern of recording insures that, during playback or reproduction, cross-talk effects can be minimized or eliminated. For example, during reproduction of the recorded signals, the reproduced signals of two successive line intervals may be added together by means of suitable delay means, for example, by a simple comb filter, to cancel out, or at least minimize cross-talk interference signals associated with the desired reproduced signals of the two successive line intervals.

However, in the above described system for recording and reproducing a color television signal, each of the audio signals thereof, for example, the stereophonic left and right signals thereof, is supplied to a respective fixed head which is continuously in contact with the magnetic tape adjacent a longitudinal edge of the latter so that the stereophonic left and right sound signals are respectively recorded in audio tracks extending longitudinally along the magnetic tape.

It will be appreciated that, when high density recording of the color video signal in successive slant tracks on the tape is effected as described above, the rotational speed of the rotary magnetic heads is relied upon to provide the desired relatively high speed of each rotary magnetic head in respect to the magnetic tape for ensuring high quality recording of the color video signal in the slant or skewed tracks. However, as earlier noted, for achieving the high density recording of the color video signal, the transport speed of the magnetic tape is necessarily quite low, for example, about 1.33 cm/sec. Thus, the relative velocity between the magnetic tape and the fixed heads which record the audio signals in the respective audio tracks is quite low with the result that the quality of the audio recording is deteriorated.

In order to solve the above problem associated with the recording of the audio signals, it has been proposed that the audio signals be frequency-modulated and then mixed with the composite color video signal to provide a mixed or combined signal supplied to the rotary magnetic heads for recording by the latter in the slant tracks. Although the foregoing proposal ensures that the relative speed of the rotary magnetic heads in respect to the magnetic tape will be sufficient to ensure that the recording quality of the audio signals will not be deleteriously affected by an inadequate head-to-tape speed, the reproduced audio signals may still be of insufficient quality in so-called "trick" reproducing modes of the VTR, for example, in the fast-forward or slow motion-reproducing mode. In such trick reproducing modes of the VTR, the speed at which the tape is advanced differs from the normal or standard speed with which the tape is advanced during recording and in the normal reproducing mode. Since the path along which each of the rotary heads scans the tape is determined in part by the tape speed, it will be apparent that the scanning path of the rotary heads in the fast-forward or slow-motion reproducing mode will be at an angle to the direction of the slant record tracks established during the recording operation with the tape being advanced at its normal speed. Thus, in the "trick" reproducing modes, the rotary heads imperfectly scan the record tracks, particularly when situated adjacent end portions of the record tracks. Such imperfect scanning of the record tracks in the "trick" reproducing modes results in the reproduction of the audio signals with noise and/or drop-outs occurring therein.

OBJECTS AND SUMMARY OF THE INVENTION

Accordingly, it is an object of this invention to provide apparatus for recording and/or reproducing video and audio signals and which avoids the previously described problems associated with the prior art.

More specifically, it is an object of this invention to provide an apparatus for recording and/or reproducing video and audio signals, and which is capable of high quality reproducing of the audio signal or signals simultaneously with the reproducing of the video signal in a "trick" reproducing mode, for example, in the fast-forward or slow-motion reproducing mode.

Another object of this invention is to provide an apparatus, as aforesaid, which can record and/or reproduce plural channels of audio signals, for example, stereophonic left and right signals, while effecting the high density recording of a video signal, and without deteriorating the qualities of either the reproduced audio or video signals.

According to an aspect of this invention, in an apparatus for reproducing video and audio signals recorded as first and second mixed signals in successive alternately arranged adjacent first and second parallel record tracks, respectively, extending obliquely or skewed on a magnetic record tape, and in which the first and second mixed signals are comprised of respective carriers of different frequencies frequency-modulated by at least one audio signal to constitute respective FM audio signals mixed with a video signal; said apparatus comprises magnetic head means scanning substantially along adjacent first and second record tracks in succession for alternately reproducing the first and second mixed signals therefrom as the tape is advanced at a normal speed in a normal reproducing mode of the apparatus, the head means scanning imperfectly along the record tracks in another or "trick" reproducing mode of the apparatus in which the tape is advanced at other than the normal speed so that the mixed signals are reproduced with noise, particularly when the head means are situated adjacent end portions of the record tracks being imperfectly scanned thereby; means for separating the FM audio signals from the respective reproduced mixed signals; frequency-demodulating means receiving the FM audio signals separated from the reproduced mixed signals and demodulating therefrom respective alternately reproduced portions of the audio signal; combining means for sequentially combining the alternately reproduced portions of the audio signal into a reconstituted audio signal; and means operative for removing from the reconstituted audio signal the noise which is reproduced with the mixed signals in said other reproducing mode.

In an embodiment of this invention, a control signal is provided in synchronism with the scanning of the magnetic head means across the tape, and the means for removing noise from the reconstituted audio signal includes means for generating a noise suppression signal in response to the control signal when the apparatus is in a "trick" reproducing mode, such noise suppression signal having an operative level at the commencement and conclusion of the movement of the magnetic head means across the tape, and means for suppressing noise in the reconstituted audio signal in response to the operative level of the noise suppression signal.

In other embodiments of the invention, the means for removing the noise in the "trick" or other reproducing mode includes means for detecting a level of noise in the reconstituted audio signal, and noise compensating means made operative whenever the detected noise level exceeds a predetermined threshold level.

The noise compensating or suppressing means may be effective to hold levels of the reconstituted audio signal and to replace the latter with a held level when the detected noise level exceeds the predetermined threshold. Alternatively, the noise compensating or suppressing means may be effective to mute noise included in the reconstituted audio signal, for example, by replacing the same with a signal of a predetermined level. Further, in response to the duration of the time in which the detected noise level exceeds the predetermined threshold, the noise compensating or suppressing means may be effective selectively to replace the noise with a held level of the reconstituted audio signal or to mute the noise by replacing the same with a signal of a predetermined level.

The above, and other objects, features and advantages of the present invention, will be apparent from the following detailed description of illustrative embodiments which is to be read in conjuncton with the accompanying drawings in which the same reference numerals identify the corresponding elements and parts in the several views.

BRIEF DESCRIPTION OF THE DRAWINGS

FIGS. 1A and 1B, together, are a schematic block diagram illustrating the recording circuit of a video and audio signal recording and/or reproducing apparatus according to an embodiment of this invention;

FIG. 2 is a diagram showing the frequency spectrum of frequency-modulated audio signals, and to which reference will be made in explaining the operation of the recording circuit of FIGS. 1A and 1B;

FIG. 6 is a diagramatic view of a section of magnetic tape, and illustrating various tracks thereon in which video and audio signals are recorded by the recording circuit of FIG. 1;

FIG. 8 is a diagramatic view of a section of magnetic tape similar to that of FIG. 6, but showing the paths along which rotary heads of the reproducing circuit of FIGS. 7A and 7B scan the tape in a fast-forward reproducing mode;

FIGS. 9A-9G are waveform diagrams to which reference will be made in explaining the operation of the reproducing circuit of FIGS. 7A and 7B;

FIGS. 10A and 10B are circuit diagrams showing examples of noise compensating circuits that may be included in the reproducing circuit of FIGS. 7A and 7B;

FIGS. 11A, 11B and 11C, together, are a block diagram showing a reproducing circuit according to another embodiment of this invention for reproducing video and audio signals recorded by the apparatus of FIG. 1, and which is particularly suited to the reproducing of such signals in a slow-motion mode;

FIG. 11D is a fragmentary block diagram illustrating a modification of the reproducing circuit of FIGS. 11A-11C;

FIG. 12 is a schematic view illustrating the positional relationship of three reproducing heads which are included in the embodiment of FIGS. 11A-11C;

FIG. 13 is a diagramatic view of a section of magnetic tape similar to FIG. 8, but showing the paths along which the tape is scanned by the heads of the recording circuit of FIGS. 11A-11C in the slow-motion reproducing mode of the apparatus;

FIGS. 14A-14G are waveform diagrams to which reference will be made in explaining the operation of the reproducing circuit of FIGS. 11A-11C.

DESCRIPTION OF A PREFERRED EMBODIMENT

Figure 1A:
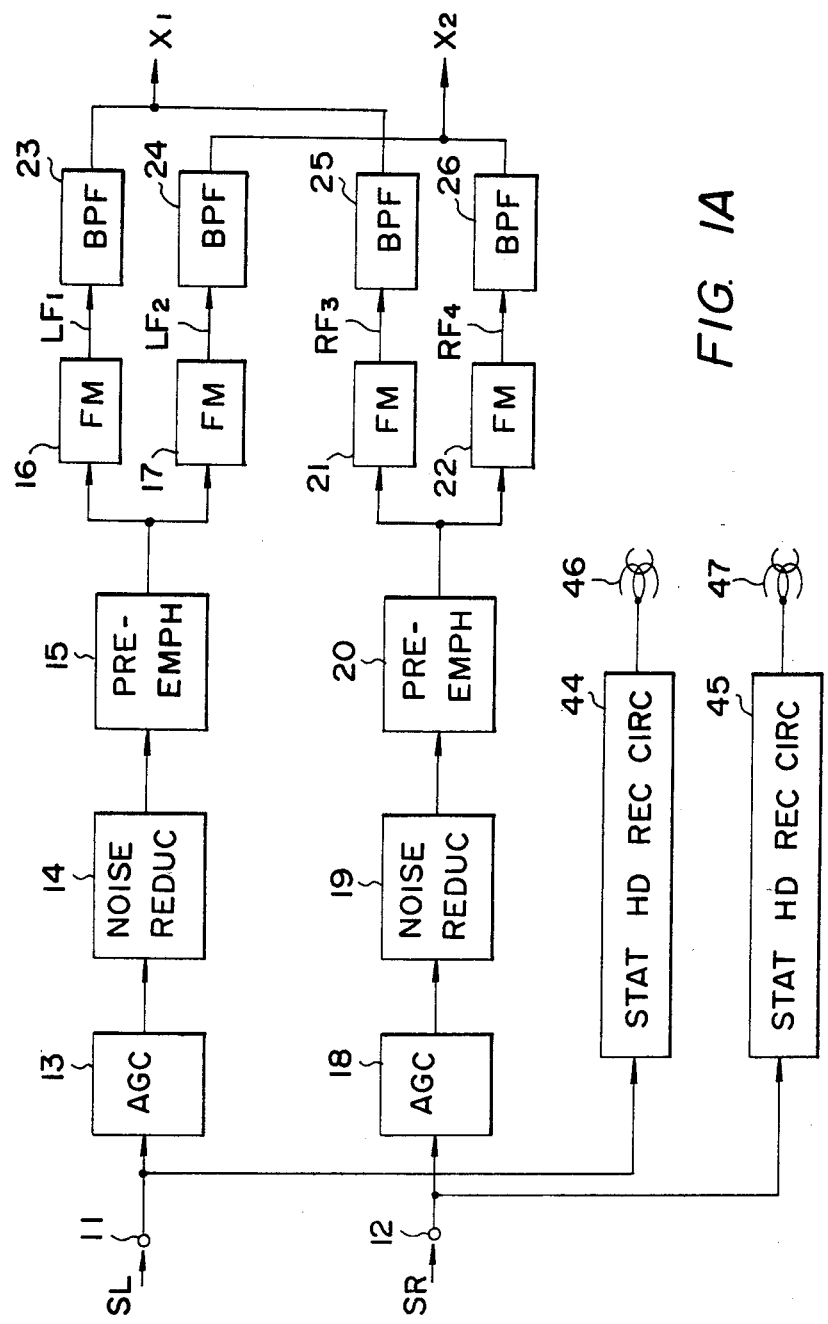

Referring to the drawings in detail, and initially to FIGS. 1A and 1B thereof, it will be seen that in a circuit or apparatus 10 for recording video and audio signals so as to make possible the high quality reproduction of the audio according to this invention, audio signal input terminals 11 and 12 receive first and second audio signals, for example, a left channel signal SL and a right channel signal SR of a stereophonic sound or audio signal. The left channel signal SL is supplied from terminal 11 through an automatic gain control amplifying circuit 13, a noise reduction circuit 14, and a pre-emphasis circuit 15, in succession, to first and second frequency modulators (FM modulators) 16 and 17. Similarly, the right channel signal SR is supplied from terminal 12 through an automatic gain control amplifying circuit 18, a noise reduction circuit 19 and a pre-emphasis circuit 20, in succession, to third and fourth frequency modulators (FM modulators) 21 and 22.

The first frequency modulator 16 frequency modulates a carrier having a frequency $f_1$, for example, of 1.325 MHz, by the left channel signal SL so as to provide a frequency shift or deviation of the carrier of about 100 to 150 KHz, and to provide at the output of FM modulator 16 a frequency modulated left channel signal or first FM audio signal $LF_1$. The second frequency modulator 17 similarly frequency-modulates, by means of the left channel signal SL, a carrier having a frequency $f_2$, for example, or 1.475 MHz, which is higher than the frequency $f_1$ so as to provide at the output of frequency modulator 7 another frequency modulated left channel signal, hereinafter referred to as a second FM audio signal $LF_2$ having the same frequency shift width or deviation as the first FM audio signal $LF_1$, that is, a frequency deviation of about 100 to 150 KHz, but around a different central frequency. The third and fourth frequency modulators 21 and 22 employ the right channel signal $S_R$ to frequency-modulate a carrier having a frequency $f_3$, for example, of 1.625 MHz, higher than the frequency $f_2$, and a carrier having a frequency $f_4$, for example, of 1.775 MHz, higher than the frequency $f_3$. The frequency modulators 21 and 22 also provide a frequency shift width or deviation of the respective carriers of about 100 to 150 KHz in response to the modulating right channel signal SR, and provide, at their respective outputs, frequency modulated right channel signals $RF_3$ and $RF_4$, hereinafter referred to as third and fourth FM audio signals, which have frequency shift or deviation bands different from each other and also different from the frequency shift or deviation bands of the first and second FM audio signals $LF_1$ and $LF_2$, respectively, as shown on FIG. 2.

In the foregoing example of the invention, the central frequencies $f_1$, $f_2$, $f_3$ and $f_4$ of the carriers are selected so that the differences between adjacent carrier frequencies, that is, 150 KHz, will cause the beat noise component between the left FM signals $LF_1$ and $LF_2$ and the right FM signals $RF_3$ and $RF_4$, after being demodulated, to be outside the reproduced audio signal band.

The first and second or left FM audio signals $LF_1$ and $LF_2$ and the third and fourth or right FM audio signals $RF_3$ and $RF_4$ are passed from modulators 16, 17, 21 and 22 through corresponding band-pass filters 23, 24, 25 and 26, respectively. The levels of the FM audio signals $LF_1$, $LF_2$, $RF_3$ and $RF_4$ are suitably adjusted so as to have successively increased values, that is, so that $LF_1 < LF_2 < RF_3 < RF_4$, as shown on FIG. 2, in which the abscissa represents the frequency f and the ordinate represents the levels of the frequency modulated audio signals. It will be apparent that these signals $LF_1$, $LF_2$, $RF_3$ and $RF_4$ are sequentially arranged with the same difference or interval between their respective central frequencies, and with the respective frequency shift bands or deviation ranges of the adjacent FM audio signals being very close to each other, or even slightly overlapping, so that the entire frequency band encompassing the FM audio signals $LF_1$, $LF_2$, $RF_3$ and $RF_4$ is relatively narrow.

The left FM signal $LF_1$, that is, the first FM audio signal, from band pass filter 23 and the right FM signal $RF_3$, that is, the third FM audio signal from band pass filter 25 are supplied to a mixing amplifier 27, while the left FM signal $LF_2$ or second FM audio signal from band pass filter 24 and the right FM signal $RF_4$ or fourth FM audio signal from band pass filter 26 are supplied to a mixing amplifier 28. The mixed output of mixing amplifier 27, that is, the first FM audio signal $LF_1$ combined with the third FM audio signal $RF_3$, is applied to an adder or mixer 29 to be mixed in the latter with a composite video signal composed of a frequency-modulated luminance signal $L_m$ and a chrominance signal C, so as to provide therefrom a first mixed audio and video signal $M_1$ at an output of mixer 29. Similarly, the output of mixing amplifier 28, that is, the second FM audio signal $LF_2$, combined with the fourth FM audio signal $RF_4$ is supplied to an adder or mixer 30 so as to be mixed or combined in the latter with the frequency-modulated luminance signal $L_m$ and the chrominance signal C constituting the composite color video signal for providing, at the output of mixer 30, a second mixed audio and video signal $M_2$.

The frequency-modulated luminance signal $L_m$ and the chrominance signal C may be provided by a simplified video signal processing circuit shown in FIG. 1 to comprise an input terminal 31 which receives a color video signal V containing both luminance and chrominance components. A low pass filter 32 receives the color video signal V from terminal 31 and separates therefrom the luminance component $S_y$ which is passed through a pre-emphasis circuit 33 to a frequency modulator 34 in which a carrier with a selected central frequency is frequency modulated by the luminance component to provide the frequency modulated luminance component $L_m$ passed through a high pass filter 35 to each of the adders 29 and 30. The color video signal V applied to terminal 31 is also supplied from the latter to a band pass filter 36 which separates the chrominance component $S_c$ from the color video signal and passes the chrominance component through an automatic color control circuit 37 to a frequency converter 38 in which the chrominance component is converted to a frequency band lower than that of the high side band of the frequency modulated luminance signal $L_m$ supplied to adders 29 and 30. The resulting frequency-converted chrominance component C is supplied through a low pass filter 39 to additional inputs of adders 29 and 30 so as to be combined, in the latter, with the frequency modulated luminance component $l_m$ and with the outputs of mixer amplifiers 27 and 28 for providing the mixed audio and video signals $M_1$ and $M_2$, respectively. Such mixed signals $M_1$ and $M_2$ are supplied through recording amplifiers 40 and 41 to magnetic heads 42 and 43, respectively, which preferably have different azimuth angles and which, in a recording mode of apparatus 10, are operative to record the mixed signals $M_1$ and $M_2$ in parallel adjacent record tracks on a magnetic record medium.

When the invention is desirably applied to a helical scan video tape recorder (VTR), the magnetic record medium is in the form of a magnetic tape which is suitably guided in a helical path about a substatial portion of the periphery of a guide drum (not shown), and the magnetic heads 42 and 43 are diametrically opposed and rotatably mounted in association with the guide drum for movement in a circular path coinciding with the drum periphery. In that case, during operation of apparatus 10 in the recording mode, heads 42 and 43 are rotated to alternately move obliquely across magnetic tape T, as indicated by the arrow b on FIG. 6, while tape T is suitably driven at a normal or standard speed in the longitudinal direction indicated by the arrow a, whereby head 42 scans alternating slant or oblique tracks indicated at $t_1$ while head 43 scans the remaining alternating tracks indicated at $t_2$. Thus, if one considers any of the next adjacent parallel slant tracks on tape T, such tracks $t_1$ and $t_2$ are respectively scanned by the heads 42 and 43. Usually, but not necessarily, each of tracks $t_1$ and $t_2$ has recorded therein the video signal information corresponding to a respective field interval of the video signal. Since the heads 42 and 43 have air gaps arranged at substantially different azimuth angles in respect to the plane of rotation of heads 42 and 43, each of the heads, when recording the respective mixed audio and video signal $M_1$ or $M_2$ in the respective tracks on tape T, effects magnetization of magnetic domains in the magnetic coating of the tape in what would appear to be, if such domains were visible, a series of parallel lines or stripes extending across the respective track and each having an orientation that corresponds to the azimuth angle of the respective head. Furthermore, during recording, the standard or normal speed of advancement of tape T in the direction a is preferably selected so that there will be no guard bands or unrecorded areas between the adjacent tracks $t_1$ and $t_2$ for increasing the recording density of the color video signal on the tape.

In reproducing the mixed signals $M_1$ and $M_2$ recorded in the adjacent tracks $t_1$ and $t_2$ by means of magnetic heads 42 and 43, respectively, or by other reproducing or playback heads having corresponding azimuth angles and alternately scanning the tracks $t_1$ and $t_2$, as each head scans the respective track, the well-known azimuth loss results in attenuation of the signals reproduced by that head from the adjacent tracks. Since such azimuth loss is generally proportional to the frequency of the signal, azimuth loss is relatively ineffective to decrease or eliminate interference due to cross-talk from the low frequency or frequency-converted chrominance component of the recorded composite color video signal. Thus, although the apparatus 10 of FIGS. 1A and 1B is shown, for the sake of simplicity, to merely frequency-convert the chrominance component of the incoming color video signal V for providing a relatively low frequency band for the chrominance component C of the composite color video signal included in mixed signals $M_1$ and $M_2$, the recording apparatus may be of the type disclosed in the previously mentioned U.S. Pat. No. 4,007,482, or in U.S. Pat. No. 4,007,484, also issued Feb. 8, 1977 and having a common assignee herewith, and in which interference or cross-talk between low frequency signals recorded in adjacent tracks is reduced or eliminated by recording the chrominance component with different first and second carriers in the adjacent tracks $t_1$ and $t_2$. Such first and second carriers modulated by the chrominance component $S_c$ for recording in adjacent tracks, respectively, may be distinguished from each other by their respective frequency and/or polarity characteristics so that, upon reproduction of the signal recorded in a particular track $t_1$ or $t_2$, the low frequency band of the cross talk from the tracks $t_2$ or $t_1$, respectively, adjacent thereto can be conveniently suppressed or eliminated by reason of the different frequency and/or polarity or phase characteristics of the respective carriers.

Referring again to FIGS. 1A and 1B, it will be seen that apparatus 10 preferably further includes stationary head recording circuits 44 and 45 through which left channel signal SL and right channel signal SR are supplied from input terminals 11 and 12 to fixed magnetic heads 46 and 47, respectively, disposed adjacent tape T and being operative, in the recording mode of apparatus 10, to record the left channel signal SL and the right channel signal SR in respective longitudinal tracks $t_L$, and $t_R$, extending along a longitudinal edge of tape T (FIG. 6), as in a conventional VTR.

In order to permit the alternating slant or oblique record tracks $t_1$ and $t_2$ to be distinguished from each other when reproducing the signals recorded therein, recording apparatus 10 may further include a vertical sync separator 48 which separates the vertical synchronizing signals from the luminance component $S_Y$ passing through low pass filter 32. The separated vertical synchronizing signals are applied to a flip-flop 49 which provides control signals CTL occurring in correspondence with the recording of color video signals in alternating or every other one of the tracks $t_1$ and $t_2$. The control signals from flip-flop 49 are applied through an amplifier 50 to a fixed head 51 which is disposed adjacent the longitudinal edge portion of tape T remote from the conventional audio tracks $t_{L'}$ and $t_{R'}$. Thus, as tape T is longitudinally advanced during a recording operation of apparatus 10, head 51 records control signals CTL in the longitudinal track $t_{CTL}$ appearing on FIG. 6 for identifying the slant tracks $t_1$ and $t_2$ in which signals are recorded by the rotary heads 42 and 43, respectively.

Figure 3:
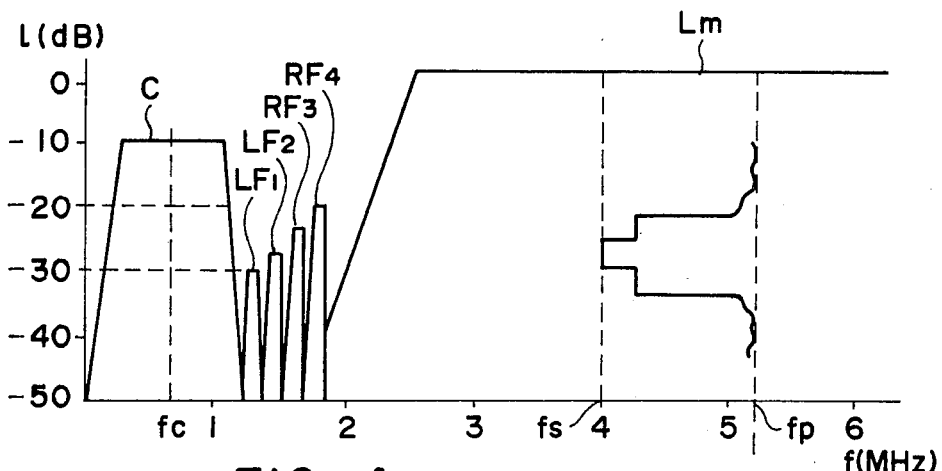
FIG. 3 is a diagram showing the frequency spectrum of the frequency-modulated audio signals of FIG. 2 together with the chrominance and luminance components of a video signal, and to which reference will also be made in explaining operation of the recording circuit of FIG. 1.

Referring now to FIG. 3, it will be seen that the frequency $f_c$ of the color sub-carrier of the frequency-converted chrominance signal C has a sufficiently low value, for example, 688 kHz, so that the resulting low frequency band of chrominance signal C will be below the band of the first FM audio signal $LF_1$ having the previously mentioned central frequency $f_1$ of 1.325 MHz. Further, the central frequency of the carrier to be modulated by the luminance component $S_Y$ in frequency modulator 34 is selected, for example at 4.6 MHz, and the modulation degree is selected so that, in the resulting frequency-modulated luminance signal $L_m$, the sync signal of the luminance component corresponds to a frequency $f_s$, for example, of 4.0 MHz, which is substantially higher than the central frequency $f_4$ of FM audio signal $RF_4$, while the white peak or maximum amplitude of the luminance component corresponds to a frequency $f_p$, for example, of 5.2 MHz, which is higher than the frequency $f_s$ by a predetermined amount, that is, by 1.2 MHz in the example given. It will be appreciated from FIG. 3, that, with such exemplary values given for the color sub-carrier frequency $f_c$ of the frequency-converted chrominance signal C, and for the frequencies $f_s$ and $f_p$ of the frequency-modulated luminance signal $L_m$, the resulting composite color video signal to be recorded in tracks $t_1$ and $t_2$ has a gap or space in its spectrum between the frequency-converted chrominance signal C and the frequency-modulated luminance signal $L_m$ for substantially accommodating the FM audio signals $LF_1$, $LF_2$, $RF_3$ and $RF_4$.

Further, as shown on FIG. 3, the level of the frequency-converted chrominance signal C is desirably selected to be larger than the levels of the all of the FM audio signals $LF_1$, $LF_2$, $RF_3$ and $RF_4$, and the level of the frequency-modulated luminance signal $L_m$ is selected to be larger than the level of chrominance signal C. It will be appreciated that the sequentially arranged left FM signals $LF_1$ and $LF_2$ and right FM signals $RF_3$ and $RF_4$ are located closed to one another in the space or gap between the bands of the frequency-converted chrominance signal C and the frequency-modulated luminance signal $L_m$ so as to minimize, as much as possible, the gap that needs to be provided between the signals C and $L_m$ of the composite video signal and suppression of the latter required for accommodating the FM audio signals $LF_1$, $LF_2$, $RF_3$ and $RF_4$.

Figure 4:
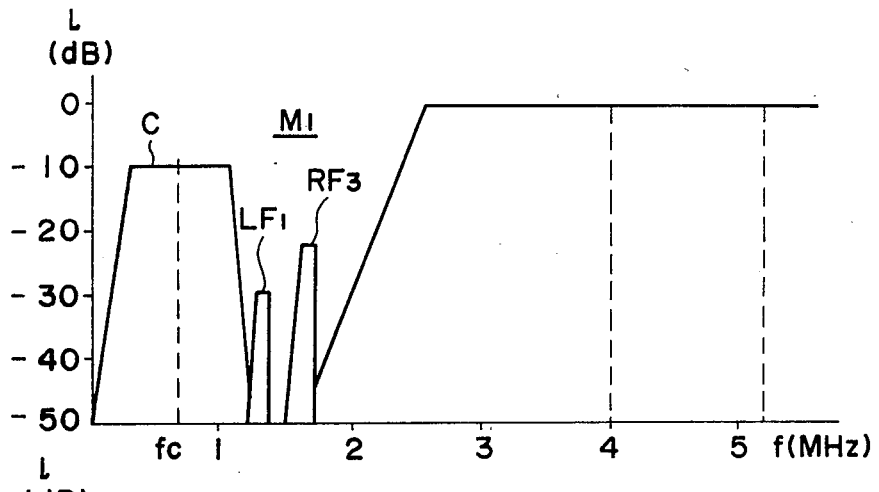
FIGS. 4 and 5 are diagrams showing the frequency spectra of mixed signals which are recorded in parallel adjacents tracks, respectively, on a magnetic tape by the recording circuit of FIGS. 1A and 1B.

As earlier noted, the first mixed signal $M_1$, in which frequency-converted chrominance signal C and frequency-modulated luminance signal $L_m$ are mixed with left FM signal $LF_1$ and right FM signal $RF_3$, is supplied from adder 29 through amplifier 40 to rotary magnetic head 42. The second mixed signal $M_2$, in which the frequency-converted chrominance signal C and the frequency-modulated luminance signal $L_m$ are mixed with the left FM signal $LF_2$ and the right FM signal $RF_4$, is supplied from adder 30 through amplifier 41 to rotary magnetic head 43. These rotary magnetic heads 42 and 43, which have different azimuth angles, alternately form or scan the oblique or slant tracks $t_1$ and $t_2$, respectively, with no guard bands therebetween, whereby the first and second mixed signals $M_1$ and $M_2$ are alternately recorded in such tracks $t_1$ and $t_2$. The first and second mixed signals $M_1$ and $M_2$ alternately recorded in tracks $t_1$ and $t_2$ have the frequency spectra shown in FIGS. 4 and 5, respectively. It will be appreciated therefrom that, in the illustrated embodiment of this invention, the FM audio signals recorded in each track $t_1$, that is, the left FM signal $LF_1$ and the right FM signal $RF_3$ do not have adjacent frequency bands. Similarly, the FM audio signals recorded in each track $t_2$, that is, the left FM signal $LF_2$ and the right FM signal $RF_4$ do not have adjacent frequency bands. Further, it will be appreciated that the FM audio signals $LF_1$ and $RF_3$ are recorded in each track $t_1$ by the rotary head 46 with an azimuth angle different from that with which the head 47 records the FM audio signals $LF_2$ and $RF_4$ in each adjacent track $t_2$. Furthermore, the carrier frequencies $f_1$ and $f_3$ and the carrier frequencies $f_2$ and $f_4$ of the FM audio signals recorded in the adjacent slant tracks $t_1$ and $t_2$, respectively, are not coincident with each other.

At the same time that the FM audio signals contained in mixed signals $M_1$ and $M_2$ are being recorded along with the composite color video signal in slant tracks $t_1$ and $t_2$ by means of rotary heads 42 and 43, apparatus 10 may also record the left and right channel signals SL and SR in longitudinal tracks $t_L$, and $t_R$, by means of fixed heads 46 and 47 so that the tape T thus recorded can be played back or is compatible with a conventional VTR in which only fixed heads are provided for reproducing the recorded audio signals.

In respect to the FM audio signals recorded with the frequency-converted chrominance signal C and the frequency-modulated luminance signal $L_m$ by the rotary magnetic heads 42 and 43 in the slant tracks $t_1$ and $t_2$, it will be seen that, since the relative speed of rotary heads 42 and 43 in respect to magnetic tape T is selected to be sufficiently high for recording the video signal, such high relative speed ensures high quality recording of the audio signals, such as the stereophonic left channel signal and right channel signal, while using a narrow frequency band for the corresponding FM audio signals $LF_1$, $LF_2$, $RF_3$ and $RF_4$ for preventing suppression of the frequency band of the composite color video signal.

Figure 5:
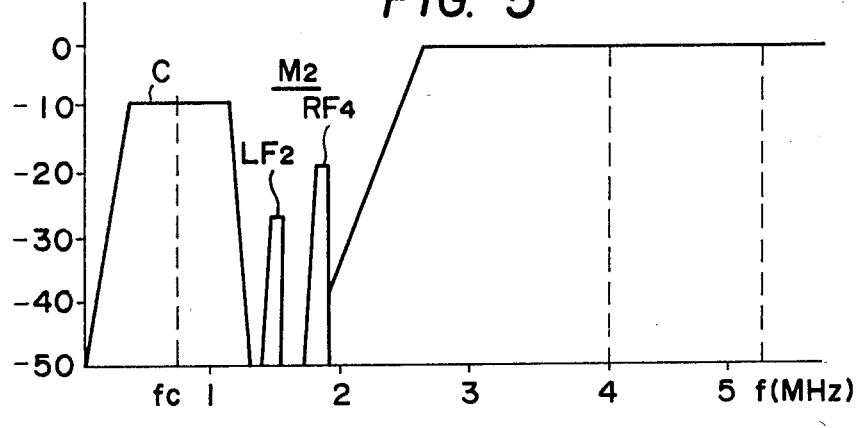

When the composite color video signal and the FM audio signals are recorded together in the slant tracks $t_1$ and $t_2$ in the manner described above, the corresponding audio signals, for example, the left and right channel signals can be reproduced with good separation from each other and with minimized interference due to cross talk from adjacent tracks. The manner in which such advantageous reproduction is effected in accordance with this invention will be described with reference to FIGS. 7A and 7B in which a reproducing apparatus 10' or a reproducing circuit of a recording and reproducing apparatus is shown to include rotary magnetic heads 42' and 43' corresponding to the heads 42 and 43, respectively, of the recording section or apparatus 10, and being operative in the normal reproducing mode to alternately scan the slant tracks $t_1$ and $t_2$ formed on magnetic tape T by such recording apparatus or section. The movements of rotary heads 42' and 43' are suitably controlled, for example, by a known servo system (not shown), so that, in the normal reproducing mode in which tape T is advanced at the normal or standard speed, during one field head 42' scans along a slant track $t_1$ and, during the next field, the other rotary magnetic head 43' scans along the next adjacent slant track $t_2$. Since the head 42' has an azimuth angle corresponding to that of the head 42 with which mixed signal $M_1$ was recorded in slant track $t_1$, and head 43' has an azimuth angle corresponding to that of the magnetic head 43 with which mixed audio and video signal $M_2$ was recorded in slant track $t_2$, magnetic head 42' mainly reproduces the first mixed signal $M_1$ from the scanned track $t_1$ with the frequency spectrum shown in FIG. 4, and the second mixed signal $M_2$ having the frequency spectrum shown in FIG. 5 is mixed therewith only as a cross talk component from the adjacent tracks $t_2$. On the other hand, magnetic head 43' mainly reproduces the second mixed signal $M_2$ from the track $t_2$ being scanned and having the frequency spectrum of FIG. 5, while the first mixed signal $M_1$ is mixed therewith only as the cross talk component from the adjacent tracks $t_1$. The outputs from heads 42' and 43' are respectively supplied through reproducing amplifiers 53 and 54 to a video signal processing circuit 55 which, in correspondence to the simplified video signal processing circuit in the recording apparatus or circuit 10 of FIG. 1, is effective to separate the frequency-converted chrominance signal C and the frequency-modulated luminance signal $L_m$ from each of the mixed signal $M_1$ and $M_2$ and then to reconvert the chrominance signal to its original frequency band and to demodulate the frequency-modulated luminance signal.

Of course, if the chrominance signal has been recorded with different first and second carriers in the adjacent tracks $t_1$ and $t_2$, for example, as mentioned above with reference to U.S. Pat. No. 4,007,482 and No. 4,007,484, then the video signal processing circuit 55 of reproducing circuit 10' may be arranged as shown in either of those patents for suppressing or eliminating the low frequency band of cross talk between tracks $t_1$ and $t_2$ by reason of the different frequency and/or polarity or phase characteristics of the respective carriers.

The output of head 42', as obtained from reproducing amplifier 53, is also supplied to band pass filters 56 and 57 which respectively pass therethrough the left FM signal $LF_1$ and the right FM signal $RF_3$. Although such left FM signal $LF_1$ and right FM signal $RF_3$ in the output from head 42' are reproduced from the same slant track $t_1$, the frequency bands of such signals $LF_1$ and $RF_3$ are spaced from each other, that is, are not immediately adjacent, as is apparent from FIG. 4, so that such FM audio signals $LF_1$ and $RF_3$ can be satisfactorily separated from each other by band pass filters 56 and 57. Thus, in the normal reproducing mode, band pass filters 56 and 57 deliver the left FM signal $LF_1$ and the right FM signal $RF_3$, respectively, without mixing therewith any substantial cross talk component of the other. Similarly, the output of head 43', as obtained from reproducing amplifier 54, is supplied to band pass filters 58 and 59 which respectively permit the left FM signal $LF_2$ and the right FM signal $RF_4$ to pass therethrough. Although such FM audio signals $LF_2$ and $RF_4$ in the output from head 43' are also reproduced from the same slant track $t_2$, their frequency bands are also spaced from each other, as shown on FIG. 5, and such signals can be effectively separated from each other by band pass filters 58 and 59. Thus, in the normal reproducing mode, band pass filters 58 and 59 provide, at their outputs, the left FM signal $LF_2$ and the right FM signal $RF_4$, respectively, with each such signal being essentially free of any cross talk component from the other.

The left FM signals $LF_1$ and $LF_2$ and the right FM signals $RF_3$ and $RF_4$ obtained from band pass filters 56 and 58 and band pass filters 57 and 59, respectively, are supplied through amplitude limiters 60, 61, 62 and 63, respectively, to corresponding FM demodulators 64, 65, 66 and 67. It will be appreciated that, during the reproduction of the fields of the video signal recorded in slant tracks $t_1$, portions of the demodulated, reproduced left and right channel signals $SL_1$ and $SR_1$, respectively, appear at the outputs of demodulators 64 and 66, respectively. On the other hand, during the reproduction of fields of the video signal recorded in tracks $t_2$, portions of the demodulated reproduced left and right channel signals $SL_2$ and $SR_2$, respectively, appear at the outputs of frequency demodulators 65 and 67. Such outputs of frequency demodulators 64, 65, 66 and 67 are passed through low pass filters 68, 69, 70 and 71, respectively, which, for example, have cut-off frequencies of less than about 150 KHz so as to pass the audio signal band while removing from the audio signals supplied thereto any beat noises that may occur in the outputs of frequency demodulators 64–67 due to the existence of cross talk components in the signals reproduced by heads 42' and 43'. More particularly, in the previously described recording apparatus or section 10, the carrier frequencies $f_1$, $f_2$, $f_3$ and $f_4$ of FM audio signals $LF_1$, $LF_2$, $RF_3$ and $RF_4$, respectively, have been selected so that the difference between the adjacent carrier frequencies, for example, 150 kHz, and hence the frequency of the described beat noise, will be outside the signal band passed by low pass filters 68–71. Thus, any beat noises appearing at the outputs of frequency demodulators 64–67 are removed by filters 68–71, respectively.

In view of the above, in the normal reproducing mode, portions of the reproduced left channel signal SL, without any components of the right channel signal SR or any beat noise mixed therewith, are provided at the outputs of low pass filters 68 and 69 in alternating fields of the video signal. Similarly, portions of the reproduced right channel signal SR, without any components of the left channel signal SL or any beat noise mixed therewith, are provided at the outputs of low pass filters 70 and 71 during alternating fields of the reproduced video signal.

The portions $SL_1$ and $SL_2$ of the reproduced left channel signal obtained from low pass filters 68 and 69, as described above, are alternately passed through a switch circuit 72 changed over at each video field period in response to a suitable control signal Q which, for example, may be obtained from a signal generator driven with the rotary heads 42′ and 43′, as is conventional. Thus, a reconstituted left channel signal SL′ is obtained from the output of switch circuit 72. Similarly, the portions of the right channel signal SR obtained from low pass filters 70 and 71 in alternating fields of the video signal are alternately passed through a switch circuit 74 under the control of the switch control signal Q so that a reconstituted right channel signal SR′ is obtained at the output of switch circuit 74. Such reconstituted left and right channel audio signals SL′ and SR′ obtained from the outputs of switch circuits 72 and 74, and which are substantially continuous in the normal reproducing mode, are passed through drop-out compensating circuits 75 and 76, respectively, for cancelling or removing from the respective signals noises caused by drop-outs occurring at random in the outputs from magnetic heads 42′ and 43′, and then through de-emphasis circuits 77 and 78, respectively, which are complementary to the pre-emphasis circuits 15 and 20 in recording circuit 10 and include low pass filters (not shown). The resulting left and right channel audio output signals are applied through, switching circuits 79 and 80, respectively, to audio output terminals 81 and 82. The switching circuits 79 and 80 are provided for selectively supplying to the respective audio output terminals 81 and 82 either reconstituted left and right channel audio signals SL′ and SR′, as reproduced from the slant tracks $t_1$ and $t_2$ by rotary heads 42′ and 43′, as described above, or the left and right channel signals reproduced by fixed heads 46′ and 47′ (FIG. 7) from the conventional longitudinal audio tracks $t_L'$ and $t_{R'}$ on the tape and which are supplied to switching circuits 79 and 80 through conventional audio signal processing circuits 83 and 84, respectively.

As earlier noted, the drop-out compensating circuits 75 and 76 are provided to compensate for those drop-outs that occur at random in the respective reconstituted audio signals SL′ and SR′, respectively, during the scanning of record tracks $t_1$ and $t_2$ by heads 42′ and 43′, for example, as a result of dust on the tape or an imperfection in the magnetic coating or recording. Such drop-outs occurring at random within record tracks $t_1$ and $t_2$ are of short durations, for example, of 10 to 100 $\mu$sec. In the reproducing circuit 10′ of FIG. 7, the random drop-outs of short duration are detected in respect to the FM audio signals $RF_3$ and $RF_4$ separated from the mixed signals $M_1$ and $M_2$ reproduced by heads 42′ and 43′. More particularly, level detectors 85 and 86 are connected to the outputs of band pass filters 57 and 59, respectively, to detect the levels of the separated FM audio signals $RF_3$ and $RF_4$. The detected signal levels are applied from detectors 85 and 86 to comparators 87 and 88, respectively, in which the detected signal levels are compared with reference levels. The outputs of comparators 87 and 88 are connected to respective inputs of a switch circuit 89 which is operative by the switch control signal Q to selectively supply the compared output of comparator 87 or comparator 88 to a wave shaper 90 which is intended to provide a suitably shaped pulse or control signal W for operating drop-out compensating circuits 75 and 76.

As shown on FIG. 10A, each of drop-out compensating circuits 75 and 76 may include a normally closed switch circuit 91 connected between a resistor 92 and an amplifier 93 in a series circuit through which the respective reconstituted audio signal SL′ or SR′ is transmitted to the de-emphasis circuit 77 or 78. A capacitor 94 is connected, at one side, to a junction between switch circuit 91 and amplifier 93 and, at its other side, to ground. So long as switch 91 is closed, the respective audio signal SL′ or SR′ is transmitted without change through drop-out compensating circuit 75 or 76 and the capacitor 94 is charged to a level corresponding to that of the reconstituted audio signal. However, when switch circuit 91 is opened in response to a control pulse W from wave shaper 90, the voltage level of the charge on capacitor 94 is then applied through amplifier 93 to compensate for a drop-out in the respective reconstituted audio signal SL′ or SR′.

Figure 7A:
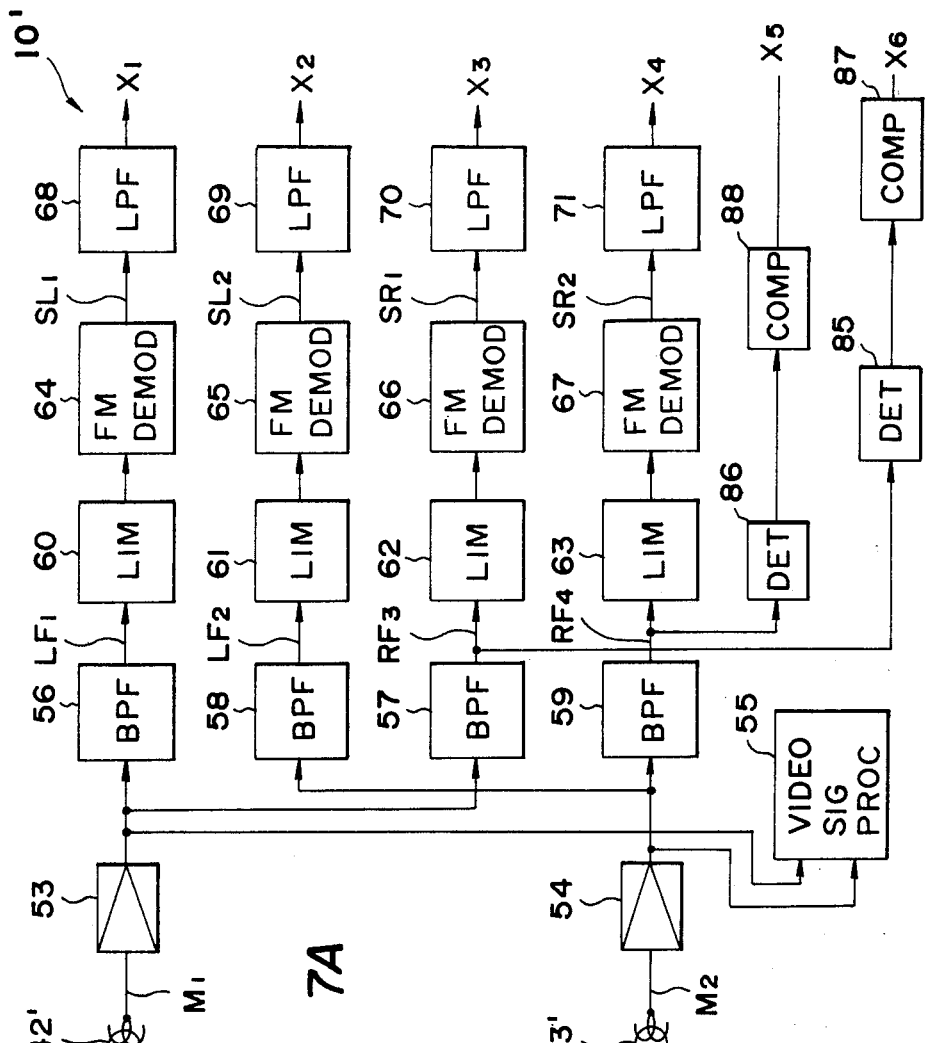
FIGS. 7A and 7B, together, are a block diagram showing a reproducing circuit according to an embodiment of the present invention for reproducing video and audio signals recorded by the circuit of FIG. 1.
Figure 7B:
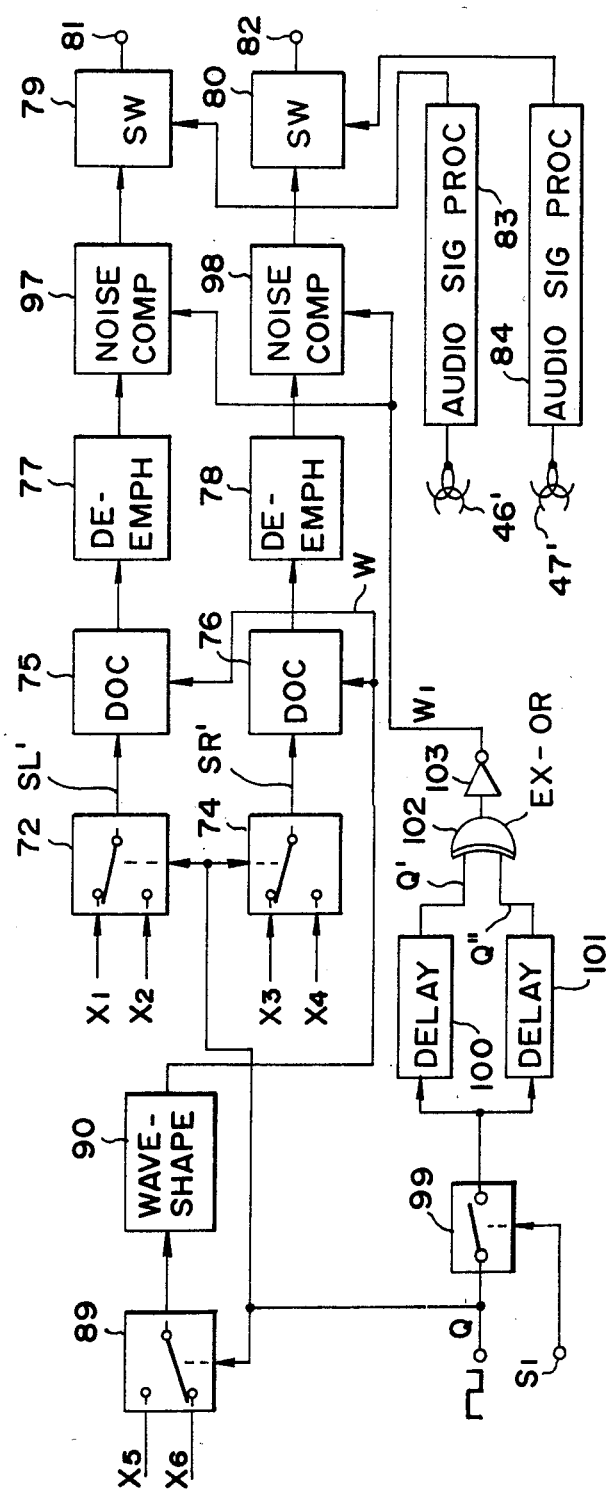

It will be appreciated that switch control signal Q maintains switch circuit 89 in the position illustrated on FIGS. 7A and 7B during the scanning by head 42′ of a track $t_1$ on the tape, at which time switch circuits 72 and 74 are also positioned, as shown, for supplying to drop-out compensating circuits 75 and 76, the demodulated audio signal portions $SL_1$ and $SR_1$ obtained from the FM audio signals $LF_1$ and $RF_3$ included in reproduced mixed signal $M_1$. Thus, in the event of a drop-out occurring at random in reproduced mixed signal $M_1$ and sensed by detector 85 and comparator 87, the resulting control pulse W from wave shaper 90 causes drop-out compensating circuits 75 and 76 to replace the drop-outs in reconstituted signals SL′ and SR′ by the immediately preceding or held levels of the demodulated signal portions $SL_1$ and $SR_1$, respectively. On the other hand, if a drop-out occurs at random in mixed signal $M_2$ during the reproducing of the latter from a track $t_2$ by head 43′, the sensing of such drop-out in FM audio signal $RF_4$ by detector 86 and comparator 88 is communicated through the then changed-over switch circuit 89 to wave shaper 90. At such time, switch circuits 72 and 74 are also changed-over from the position shown on FIGS. 7A and 7B so that the pulse W from wave shaper 90 causes drop-out compensating circuits 75 and 76 to replace the drop-outs in reconstituted audio signals SL′ and SR′ by the immediate preceding or held levels of the demodulated audio signal portions $SL_2$ and $SR_2$, respectively, derived from FM audio signals $LF_2$ and $RF_4$ included in reproduced mixed signal $M_2$.

In the circuit arrangement for each of drop-out compensating circuits 75 and 76 as described above with reference to FIG. 10A, a randomly occurring drop-out in the reconstituted audio signal SL′ or SR′ is compensated or replaced by a previously held level of the respective reconstituted audio signal. However, as shown on FIG. 10B, each of the drop-out compensating circuits 75 and 76 may be simply constituted by a switching circuit 95 which is normally in the position shown on the drawing for supplying the respective reconstituted audio signal SL' or SR' from the output of the switch circuit 72 or 74 to the respective de-emphasis circuit 77 or 78. However, when wave shaper 90 provides a pulse W in response to detection of a drop-out in the respective reproduced mixed signal $M_1$ or $M_2$, switch circuit 95 is changed-over from the illustrated position for replacing the sensed drop-out with a predetermined signal level, as from a voltage source 96.

It will be seen that, in the reproducing apparatus or section 10', switch circuits 72 and 74 are located after the frequency demodulators 64 and 65 and the frequency demodulators 66 and 67, respectively. Thus, switch circuits 72 and 74 each act to combine or join successive portions $SL_1$ and $SL_2$ or $SR_1$ and $SR_2$ of demodulated relatively low frequency signals. At least in the normal reproducing mode in which each of the rotary heads 42' and 43' closely follows a record track $t_1$ or $t_2$ when reproducing a mixed signal $M_1$ or $M_2$ therefrom, the relative low frequency or audio signal portions demodulated from mixed signals $M_1$ and $M_2$ recorded in tracks $t_1$ and $t_2$ can be combined relatively easily without large junction errors even though the audio signals do not include blanking intervals as in the case of the video signals. Further, such junction errors as do occur, due to, for example, angular deviation of rotary heads 42' and 43' from the desired diametrically opposed relation thereof, involve an abrupt or high frequency change in the reconstituted signal SL' or SR' which is substantially eliminated by the previously mentioned low pass filter conventionally included in the de-emphasis circuit 77 or 78.

However, the foregoing measures are not sufficient to achieve high-quality reproduction of the audio signals recorded with the video signal in slant tracks on the tape, particularly in so-called "trick" reproducing modes, such as, fast-forward or slow-motion reproducing modes of the apparatus in which the speed of advancement of the tape is different from the tape speed for recording and for the normal reproducing mode.

Since the path along which each of the rotary heads 42' and 43' scans the tape T is determined in part by the speed of advancement of the tape indicated by the arrow a on FIG. 8, it will be apparent that the scanning paths of the rotary heads 42' and 43' indicated by the shaded regions $u_1$ and $u_2$ on FIG. 8 for a fast-forward reproducing mode will be at an angle to the direction of the slant record tracks $t_1$ and $t_2$ established during the recording operation in which the tape is advanced at its normal speed. Thus, in a fast-forward reproducing mode, for example, in which the tape T is advanced at a speed twice that used for recording or for the normal reproducing mode, rotary heads 42' and 43' will scan respective tracks $t_1$ and $t_2$ across the full width of the latter only for portions of the lengths of such tracks and will otherwise imperfectly scan the respective record tracks. For example, by suitable servo-control of the advancement of the tape T in the direction of the arrow a relative to the rotary movements of the heads 42' and 43' in scanning across the tape in the direction of the arrow b, each of the scanning paths $u_1$ and $u_2$ of heads 42' and 43', respectively, can be made to coincide substantially with the width of a respective track $t_1$ or $t_2$ along the middle portion of the latter. In that case, the scanning paths $u_1$ and $u_2$ deviate substantially from the respective tracks $t_1$ and $t_2$ at the opposite end portions of the latter and, as shown on FIGS. 9A and 9B, the FM audio signals separated from the mixed signals $M_1$ and $M_2$ reproduced by rotary heads 42' and 43' in the fast-forward reproducing mode, and indicated at $u'_1$ and $u'_2$, will have normal signal levels only during the scanning of the middle portions of the respective tracks $t_1$ and $t_2$, and the signal levels will decrease undesirably when scanning the end portions of the respective tracks. By reason of the foregoing, when the demodulated audio signal portions $SL_1$ and $SL_2$ or $SR_1$ and $SR_2$ are combined by the operation of switch circuits 72 and 74 in response to switch control signal Q, the resulting reconstituted audio signals SL' and SR' obtained in the fast-forward reproducing mode would be of substantially reduced level, and hence, have an undesirably increased noise/signal ratio, at the junctions between those portions of the reconstituted audio signals reproduced by heads 42' and 43' from the tracks $t_1$ and $t_2$, respectively.

In order to compensate for such noise occurring in the reconstituted audio signals occurring substantially at the junctions between the portions thereof derived from reproduced mixed signals $M_1$ and $M_2$, respectively, the reproducing circuit 10' of FIGS. 7A and 7B is shown, in accordance with an embodiment of this invention, to be further provided with noise compensating circuits 97 and 98 interposed between de-emphasis circuit 77 and switch 79 and between de-emphasis circuit 78 and switch 80, respectively. Such noise compensating circuits 97 and 98 are made operative only in the fast-forward reproducing mode, for example, when the tape is advanced at twice its normal speed, as in FIG. 8. Upon the selection of the fast-forward reproducing mode, a corresponding mode selecting signal $S_1$ closes a normally open switch circuit 99 through which the control signal Q (FIG. 9C) is then supplied to first and second delay circuits 100 and 101 for obtaining respective delayed control signals Q' and Q'' (FIGS. 9D and 9E). Such delayed control signals Q' and Q'' are supplied to respective inputs of an Exclusive OR circuit 102 which has its output supplied through an inverter 103 to provide a control signal $W_1$ (FIG. 9F) for noise compensating circuits 97 and 98.

As shown particularly on FIG. 9C, control signal Q is at a high or "1" level for one field interval of the video signal, for example, during the scanning of the tape by rotary head 42' and is at a low or "0" level during the next field interval, that is, during the scanning of the tape by rotary head 43'. Further, as shown, the transition of control signal Q between its high level and its low level occurs substantially at the midpoint of each period $l_p$ during which an output from rotary head 42' overlaps or occurs simultaneously with an output from rotary head 43'. As shown particularly on FIG. 9D, delay circuit 100 has a delay time $\tau_1$ which is approximately one-half the overlap period $l_p$, while the delay time $\tau_2$ of delay circuit 101 is approximately equal to the field period less one-half the overlap period $l_p$. By reason of the foregoing, the delayed control signals Q' and Q'' are simultaneously either at their high levels or their low levels only during the overlap periods $l_p$ to provide a "0" output from Exclusive OR circuit 102 with the result that the control signal or pulse $W_1$ from inverter 103 (FIG. 9F) is at its high level only during each overlap period which may have a duration of, for example, 300μsec.

Each of noise compensating circuits 97 and 98 may be constituted by a circuit arrangement similar to that shown on FIG. 10A, in which case, in response to the high level of control signal or pulse $W_1$, the reconstituted audio signal SL' or SR' is replaced by a previously held level thereof, as shown on FIG. 9G. Alternatively, each of noise compensating circuits 97 and 98 may have a configuration similar to that shown on FIG. 10B in which case, in response to the high level of control signal or pulse $W_1$, the respective reconstituted audio signal SL' or SR' is replaced by a predetermined signal level as established by voltage source 96. In still another alternative arrangement for each of noise compensating circuits 97 and 98, the voltage source 96 on FIG. 10B may be replaced by a simple connection to ground so that, a muting action occurs for removing noise upon the change-over of switch circuit 95 by the high level of control signal or pulse $W_1$. Whichever circuit arrangement is provided for each of noise compensating circuits 97 and 98, it will be appreciated that the same is made operative in the trick or fast-forward reproducing mode for removing the noise that would otherwise appear in the reconstituted audio signal SL' or SR' when the rotary heads 42' and 43' are situated adjacent end portions of the record tracks $t_1$ and $t_2$ being imperfectly scanned thereby.

Since rotary heads 42' and 43' have different azimuth angles respectively corresponding to the azimuth angles with which mixed signals $M_1$ and $M_2$ were recorded in tracks $t_1$ and $t_2$, respectively, it will be appreciated that, in any trick reproducing mode of reproducing circuit or apparatus 10', heads 42' and 43' have to be made operative to reproduce the recorded signals only while scanning tracks $t_1$ and $t_2$, respectively. In other words, in a trick reproducing mode of circuit 10', if rotary head 43' is made operative while scanning a track $t_1$ in which a mixed signal $M_1$ has been recorded with an azimuth angle different from that of head 43', the resulting azimuth loss will prevent satisfactory reproducing of the mixed signal $M_1$ from the track $t_1$ by the rotary head 43'.

Figure 11A:
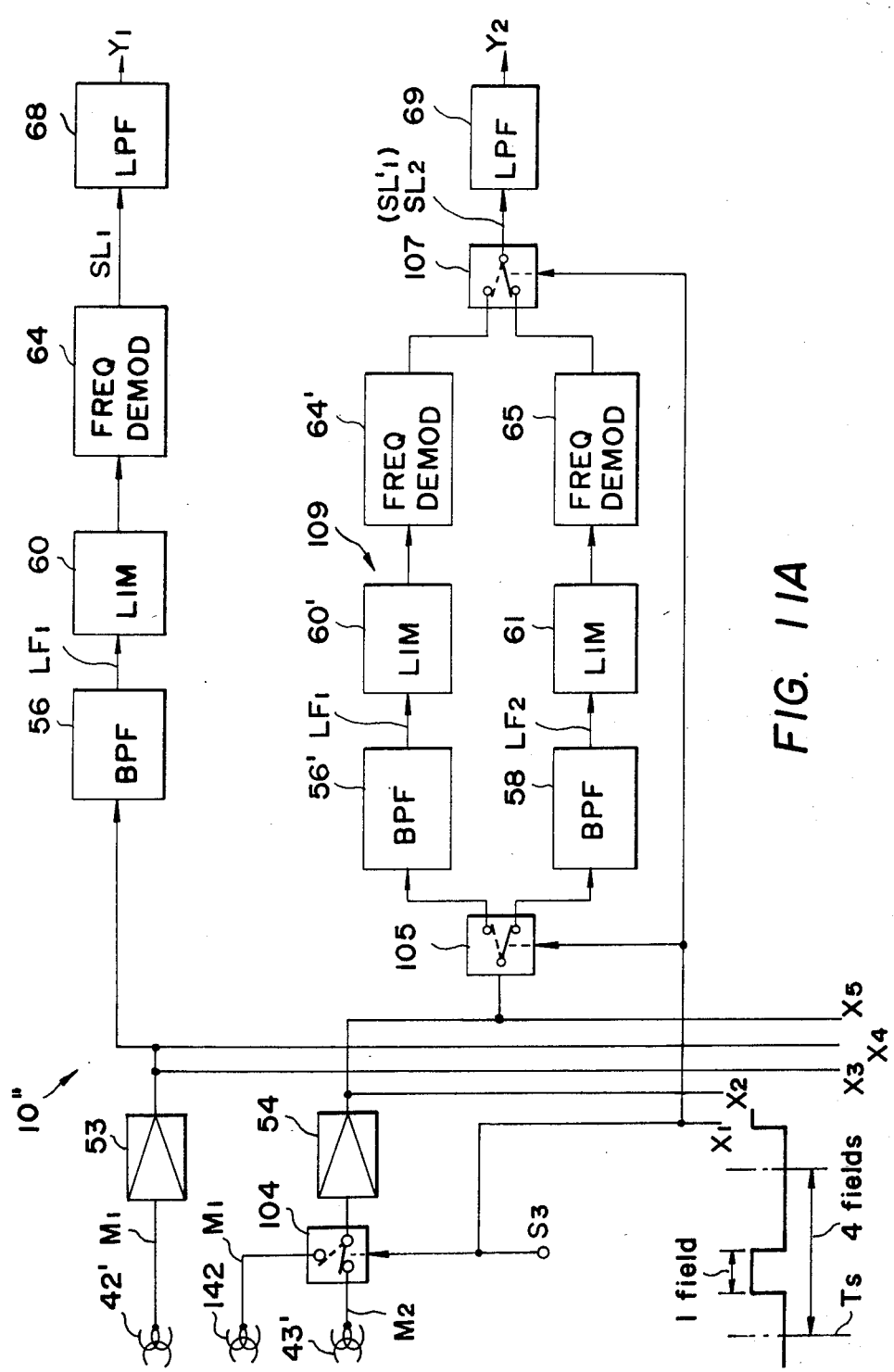

Accordingly, as shown on FIGS. 11A–11C, when a trick reproducing mode, for example, a slow-motion reproducing mode, of a reproducing circuit 10'' requires that one track on the tape T be repeatedly scanned during a plurality of successive field intervals, a normally inoperative rotary head 142 having the same azimuth angle as rotary head 42' is positioned adjacent rotary head 43', as shown on FIG. 12, and is made operative in place of head 43' when a track $t_1$ is to be scanned repeatedly during a plurality of successive field intervals.

In the reproducing circuit 10'' of FIGS. 11A–11C, in which components corresponding to those described above with reference to FIGS. 7A and 7B are identified by the same reference numerals, a switch circuit 104 is provided for alternatively connecting rotary heads 43' and 142 to the input of reproducing amplifier 54. The output of reproducing amplifier 54 is connected to inputs of a pair of switch circuits 105 and 106 arranged in parallel and which, in the positions of switch circuits 104, 105 and 106 shown in full lines on FIGS. 11A–11C, are operative to apply the mixed signal $M_2$ reproduced from a track $t_2$ by head 43' from first outputs of switch circuits 105 and 106 to band pass filters 58 and 59. As in the reproducing circuit 10' of FIGS. 7A and 7B, band pass filters 58 and 59 are operative to separate, from the reproduced mixed signal $M_2$, the respective FM audio signals $LF_2$ and $RF_4$ which are passed through limiters 61 and 63 to respective frequency demodulators 65 and 67. The resulting demodulated audio signal portions $SL_2$ and $SR_2$ are applied to first inputs of switch circuits 107 and 108 having their outputs connected through low pass filters 69 and 71 to respective inputs of switch circuits 72 and 74. Other or second outputs of switch circuits 105 and 106 are connected with respective second inputs of switch circuits 107 and 108, respectively, through alternate channels 109 and 110, respectively. The alternate channel 109 is shown to include a band pass filter 56', limiter 60' and frequency demodulator 64' corresponding to band pass filter 56, limiter 60 and frequency demodulator 64, respectively, while the alternate channel 110 is shown to include a band pass filter 57', a limiter 62' and a frequency demodulator 66' corresponding to the band pass filter 57, limiter 62 and frequency demodulator 66, respectively.

It will be appreciated from the foregoing that band pass filters 56' and 57' pass frequency bands corresponding to the bands of FM audio signals $LF_1$ and $RF_3$, respectively. Thus, when rotary head 142 is scanning a track $t_1$ for reproducing the mixed signal $M_1$ therefrom and switch circuits 104–108 are changed over from the positions shown in full lines on FIGS. 11A–11C to the positions shown in broken lines, band pass filters 56' and 57' will be operative to separate, from the reproduced mixed signal $M_1$, and respective FM audio signals $LF_1$ and $RF_3$ which are passed through limiters 60' and 62' to the respective frequency demodulators 64' and 66'. The resulting demodulated audio signal portions $SL'_1$ and $SR'_1$ are then applied through switch circuits 107 and 108 and low pass filters 69 and 71 to the respective inputs of switch circuits 72 and 74.

The reproducing circuit 10'' shown on FIG. 11 is particularly adapted for a slow-motion reproducing mode in which the tape is intermittently advanced at an aggregate speed equal to ⅓ the normal tape speed used for recording and in the normal reproducing mode. In such ⅓ slow-motion reproducing mode, the tape is suitably intermittently driven by being held at rest for an interval equivalent to three fields of the video signal, and during which the head 42', the head 142 and then the head 42' again successively scan a track $t_1$ on the tape for repeatedly reproducing the mixed signal $M_1$ therein, and then the tape is advanced at the normal tape speed through a distance along the tape equivalent to the pitch, or the distance from the center of the track $t_1$ to the center of the next adjacent track $t_2$, with the rotary head 43' being effective to scan such next adjacent track $t_2$ for reproducing the mixed signal $M_2$ therefrom during the following field interval or period. In order to achieve the desired operation of reproducing circuit 10'' for the foregoing ⅓ slow-motion reproducing mode, a switch control signal $S_2$ is suitably applied to switch circuit 99 for closing the latter upon the selection of such slow-motion reproducing mode, and a suitably generated switch control signal $S_3$ is applied simultaneously to switch circuits 104–108. The switch control signal $S_3$ is normally at a low level to maintain switch circuits 104–108 in the positions shown in full lines on FIG. 11 so long as reproducing circuit 10'' is in its normal reproducing mode. In such normal reproducing mode, circuit 10'' acts in the same manner as the previously described circuit 10' and switch circuit 99 remains open so that noise compensating circuits 97 and 98 remain inoperative.

However, when the ⅓ slow-motion reproducing mode is selected, for example, at the time $T_S$, switch control signal $S_3$ is generated to have a 4-field repeating cycle in which: during the first field interval, switch control signal $S_3$ is at a low level to maintain switch circuits 104–108 in the positions shown in full lines; in the second field interval, switch control signal $S_3$ is at a high level to change-over switch circuits 104–108 to the positions shown in broken lines; and, in the third and fourth field intervals, switch control signal $S_3$ is returned to its low level for again disposing switch circuits 104–108 in the positions shown in full lines. Further, the start of the 4-field cycle of switch control signal $S_3$ for the ⅓ slow-motion reproducing mode, that is, the time indicated at $T_s$ on FIG. 11, is made to coincide with the commencement of the scanning of a track $t_1$ by rotary head 42'. Of course, at the same time that the described switch control signal $S_3$ is being applied to switch circuits 104–108, control signal Q which alternates between its high and low levels in successive field intervals is applied to switch circuits 72 and 74 for changing-over the latter in the same manner as described with reference to FIGS. 7A and 7B. Further, in the ⅓ slow-motion reproducing mode, such signal Q is also applied through closed switch circuit 99 to delay circuits 100 and 101 which operate in association with Exclusive OR circuit 102 and inverter 103 for producing the control signal or pulse $W_1$ (FIG. 14G) by which noise compensating circuits 97 and 98 are made to operate when the rotary heads 42', 142 and 43' are situated adjacent end portions of the record tracks $t_1$ and $t_2$.

In the ⅓ slow-motion reproducing mode of circuit 10", when head 42' scans a track $t_1$ along a path indicated at $u_1$ on FIG. 13 for reproducing the mixed signal $M_1$ recorded therein, band pass filters 56 and 57 respectively separate therefrom the FM audio signals $LF_1$ and $RF_3$ each of which has a signal level indicated at $u'_1$ (FIG. 14A) between the joints $j_2$ and $j_3$ at the beginning and end, respectively, of the first field interval after the selection of the slow-motion reproducing mode at the time $T_s$. The demodulated audio signal portions $SL_1$ and $SR_1$ obtained from FM audio signals $LF_1$ and $RF_3$ in demodulators 64 and 66 are passed through switch circuits 72 and 74 in the positions shown in full lines on FIGS. 11A–11C. Thus, in the first field interval after the time $T_s$ of establishment of the slow-motion reproducing mode, the demodulated audio signal portion $SL_1$ (FIG. 14C) is selected by switch circuit 72 under the control of signal Q (FIG. 14E) to form the respective portion of the reconstituted audio signal SL'(FIG. 14F). In the next field interval commencing at the joint $j_3$, control signal $S_3$ causes change-over of switch circuits 104–108 to the positions shown in broken lines on FIGS. 11A–11C, and control signal Q also causes change-over of switch circuits 72 and 74 to the positions shown in broken lines. Thus, in such second field interval, rotary head 142 is operative to gain reproduce the mixed signal $M_1$ recorded in the track $t_1$ which is being scanned for the second time, and such reproduced mixed signal $M_1$ is supplied through switch circuits 104, 105 and 106 to band pass filters 56' and 57' for separating the FM audio signals $LF_1$ and $RF_3$, respectively. The resulting demodulated audio signal portions $SL'_1$ and $SR'_1$ obtained from frequency demodulators 64' and 66' are supplied through switch circuits 107 and 108 to switch circuits 72 and 74 which are changed over to the position shown in broken lines. Thus, in the second field interval of the operation in the slow-motion reproducing mode, the demodulated audio signal portion $SL'_1$ (FIG. 14D) derived from the second scanning of track $t_1$ by rotary head 142 is included in the reconstituted audio signal SL' (FIG. 14F). Similarly, in the second field interval of the slow-motion reproducing operation, the demodulated audio signal portion $SR'_1$ also derived from the second scanning of the track $t_1$ by rotary head 142 is included in the reconstituted audio signal SR'.

In the next or third field interval of the slow-motion reproducing operation commencing at the joint $j_4$, signal $S_3$ returns switch circuits 104–108 to the positions shown in full lines and control signal Q also returns switch circuits 72 and 74 to the positions shown in full lines. Thus, in such third field interval, the operation of the circuit shown on FIGS. 11A–11C is similar to that described above for the first field interval, that is, rotary head 42' is made operative to again reproduce the mixed signal $M_1$ from the track $t_1$ which is being scanned for the third time, and the reconstituted audio signals SL' and SR' are respectively constituted by the demodulated audio signal portions $SL_1$ and $SR_1$ from frequency demodulators 64 and 66, respectively. Finally, in the fourth or last field interval of the cycle of control signal $S_3$, switch circuits 104–108 remain in the positions shown in full lines on FIG. 11, while control signal Q causes change-over of switch circuits 72 and 74 to the positions shown in broken lines. As a result of the foregoing, in the fourth field interval during which the tape T is advanced, rotary head 43' scans a track $t_2$, as indicated at $u_2$ on FIG. 13, for reproducing the mixed signal $M_2$ recorded therein. Such reproduced mixed signal is supplied through switch circuits 104, 105 and 106 to band pass filters 58 and 59 which respectively separate therefrom the FM audio signals $LF_2$ and $RF_4$, with the level of each of such separated FM audio signals being indicated at $u'_2$ (FIG. 14B) in the time interval between the joints $j_5$ and $j_6$. The demodulated audio signal portion $SL_2$ (FIG. 14D) derived from FM audio signal $LF_2$ by demodulator 65 is passed through switch circuit 107 and then through switch circuit 72 to be included in the reconstituted audio signal SL' (FIG. 14F). Similarly, the audio signal portion $SR_2$ demodulated from FM audio signal $RF_4$ is passed through switch circuit 104 and then through switch circuit 74 to form the reconstituted audio signal SR' during the fourth field interval between joints $j_5$ and $j_6$.

As earlier noted, and as described in detail with reference to the operation of the reproducing circuit 10', the noise compensating circuits 97 and 98 of reproducing circuit 10" are made operative at each of the joints $j_3$–$j_6$ by the control signal or pulse $W_1$ produced after the establishment of the slow-motion reproducing mode (FIG.14G). By reason of such operation of noise compensating circuits 97 and 98, noise occurring at any of such joints will be removed from the reconstituted audio signals SL' and SR'. Thus, for example, in the case of the reconstituted audio signal SL' (FIG. 14F), noise N at the joints $j_3$ and $j_4$ would be removed by the operation of noise compensating circuit 97 at such joints. It will be noted that such noise N at the joints $j_3$ and $j_4$ between the demodulated audio signal portions $SL_1$ derived from the operation of rotary head 42' and the demodulated audio signal portion $SL'_1$ derived from the operation of the rotary head 142 may be caused by the mis-matching of the signal portions $SL_1$ and $SL'_1$ at the respective overlapping periods $l_p$ due to the fact that the angular distance between head 42' and head 142 is not precisely 180°, as shown on FIG. 12.

Although the circuit 10", as shown on FIGS. 11A–11C, includes alternate channels 109 and 110 for separating the FM audio signals $LF_1$ and $RF_3$ from the mixed signal $M_1$ when the latter is being reproduced by rotary head 142 and for demodulating the audio signal portions $SL'_1$ and $SR'_1$ therefrom, it is to be appreciated that such alternate channels 109 and 110 can be replaced by additional switch circuits for achieving the same results. More particularly, as shown on FIG. 11D in place of the alternate channel 109, there may be provided a switch circuit 105' disposed in advance of band pass filter 56 and a switch circuit 107' connected to the output of frequency demodulator 64. The switch circuits 105' and 107' are connected with switch circuits 105 and 107, respectively, and are also operated by control signal $S_3$. Thus, when signal $S_3$ is at its low level to dispose switches 105, 105', 107 and 107' at the positions thereof shown in full lines on FIG. 11D, a mixed signal $M_1$ reproduced from a track $t_1$ by head 42' is applied through switch circuit 105' to band pass filter 56 which separates therefrom the FM audio signal $LF_1$, whereupon the latter is demodulated in frequency demodulator 64 to provide the respective demodulated audio signal portion $SL_1$ which is passed through switch circuit 107' to low pass filter 68. With switch circuits 105 and 107 in the positions thereof shown in full lines on FIG. 11D, a mixed signal $M_2$ reproduced by head 43' from a track $t_2$ is passed through switch circuit 105 to band pass filter 58 for the separation therefrom of the FM audio signal $LF_2$ from which frequency demodulator 65 demodulates the audio signal portion $SL_2$ passed through switch circuit 107 to low pass filter 69. When control signal $S_3$ is at its high level, for example, in the second field interval following the initiation of the slow-motion reproducing mode, switch circuits 105, 105', 107 and 107' are thereby changed-over to the positions shown in broken lines on FIG. 11A. As a result thereof, a mixed signal $M_1$ reproduced by rotary head 142 from a track $t_1$ is passed through switch circuits 105 and 105' to band pass filter 56 for the separation therefrom of the FM audio signal $LF_1$ which is demodulated in frequency demodulator 64 to provide a demodulated audio signal portion $SL'_1$ which is passed through switch circuits 107' and 107 to low pass filter 69.

It will be appreciated that the alternate channel 110 on FIGS. 11A-11C may be similarly replaced by additional switch circuits associated with switch circuits 106 and 108, respectively, so that band pass filter 57 is employed for separating the FM audio signal $RF_3$ from a mixed signal $M_1$ reproduced from a track $t_1$ by either the head 42' or the head 142.

Figure 15:
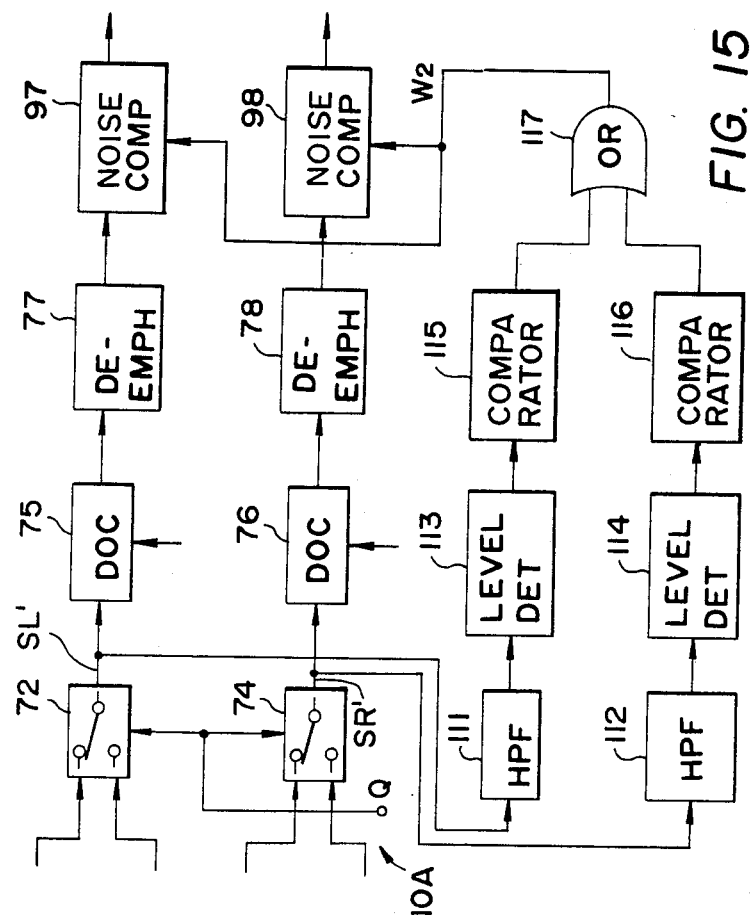
FIGS. 15 and 16 are block diagrams showing portions of reproducing circuits according to still other respective embodiments of the present invention for reproducing video and audio signals recorded by the circuit of FIGS. 1A and 1B.

In the reproducing circuits 10' and 10" according to this invention as shown on FIGS. 7A and 7B and FIGS. 11A-11C, the noise compensating circuits 97 and 98 are made operative, in the respective trick reproducing modes in response to the control signal or pulse $W_1$ (FIGS. 9F and 14G) which is derived from the control signal Q so as to occur when heads 42' and 43' or heads 42', 142 and 43' are situated adjacent end portions of the record tracks being imperfectly scanned thereby. Since the noise to be compensated for by circuits 97 and 98 will occur when the heads are situated adjacent end portions of the record tracks being imperfectly scanned thereby in a trick reproducing mode, the arrangements shown on FIGS. 7 and 11 for operating circuits 97 and 98 are suitable for removing the undesirable noise. However, if desired, noise compensating circuits 97 and 98 provided in accordance with the present invention may be made operative in response to the detection of a predetermined level of noise in the reconstituted audio signal SL' or SR' issuing from the outputs of switch circuits 72 and 74, respectively. More particularly, as shown on FIG. 15, in a reproducing circuit 10A which may be otherwise similar to the previously described circuit 10' or 10", the reconstituted audio signals SL' and SR' obtained from switch circuits 72 and 74 are also supplied to high pass filters 111 and 112, respectively, each of which may suitably have a cut-off frequency of 40 KHz. Since the low pass filters 68-71 leading to the inputs of switch circuits 72 and 74 have been described as having cut-off frequencies of 150 KHz, it will be appreciated that noise in the frequency range of 40-150 KHz will appear at the outputs of high pass filters 111 and 112. The levels of such noise issuing from the outputs of high pass filters 111 and 112 are detected by level detectors 113 and 114, respectively. The resulting detected signal levels in the form of voltage signals are applied to comparators 115 and 116 in which the detected level signals from detectors 113 and 114, respectively, are compared with reference or threshold voltage levels. Whenever the detected level signal from detector 113 or 114 exceeds the reference or threshold level, the respective comparator 115 or 116 provides a high level output or "1" signal through an OR circuit 117 for application as a control signal or pulse $W_2$ to noise compensating circuits 97 and 98 for operating the latter similarly to the signal or pulse $W_1$ in FIGS. 7A and 7B and FIGS. 11A-11C.

Figure 16:
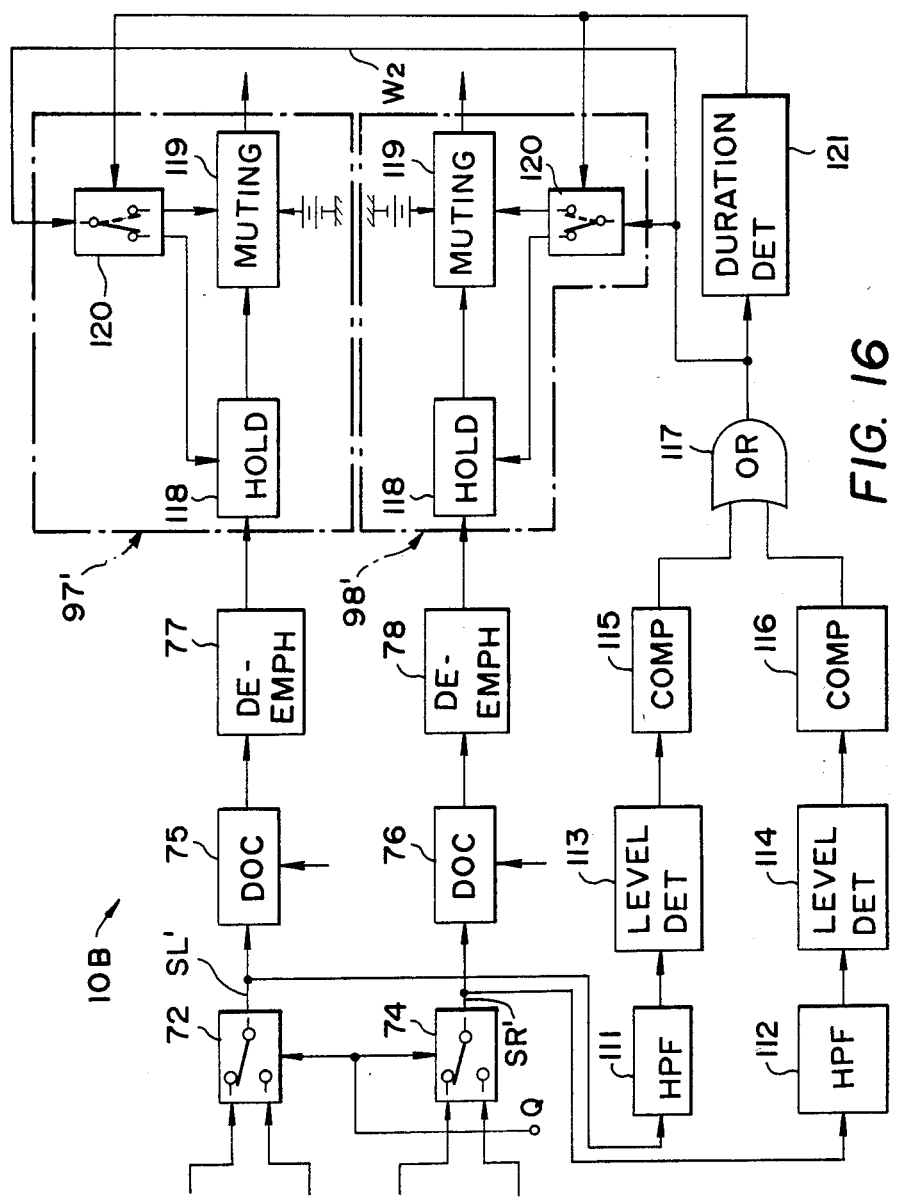

Referring now to FIG. 16, it will be seen that, in a reproducing circuit 10B which is otherwise similar to the reproducing circuit 10A described above with reference to FIG. 15, each of the noise compensating circuits 97' and 98' includes a holding circuit 118, for example, of the kind shown on FIG. 10A, and a muting circuit 119, for example, of the kind shown on FIG. 10B, connected in series to act on the output of the respective de-emphasis circuit 77 or 78. Each of the circuits 97' and 98' is further shown to include a switch circuit 120 by which the control signal or pulse $W_2$ is selectively applied to the respective holding circuit 118 or muting circuit 119 in dependence upon the duration of the pulse $W_2$ from OR circuit 117 as detected by a duration detecting circuit 121.

In the operation of the reproducing circuit 10B of FIG. 16, in the case of a short signal or pulse $W_2$ indicating the occurrence of noise of short duration at a joint or junction of the reconstituted audio signal SL' or SR', the corresponding signal from duration detector 121 disposes switch circuits 120 in the positions shown in full lines on FIG. 16 so that the control signal or pulse $W_2$ is applied to holding circuits 118. In response to the foregoing, each of holding circuits 118 substitutes, for the noise of short duration of a joint of the respective reconstituted audio signal SL' or SR', a previously held level of such reconstituted audio signal. On the other hand, if the duration of the detected noise is relatively long, the corresponding signal from duration detector 121 changes-over switch circuits 120 to the positions shown in broken lines on FIG. 16 so that the control signal or pulse $W_2$ is applied to muting circuits 119. In that case, each muting circuit 119 substitutes, for the noise of long duration of a joint or junction of the respective reconstituted audio signal SL' or SR', a predetermined or fixed signal level.

It will be appreciated from the foregoing that, in the various described embodiments of this invention, noises that may arise at the junctions in reconstituted audio signals SL' and SR', particularly in trick reproducing modes, are effectively eliminated or compensated.

Although illustrative embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An apparatus for reproducing video and audio signals recorded as first and second mixed signals in successive alternately arranged adjacent first and second parallel record tracks, respectively, extending obliquely on a magnetic record tape, and in which said first and second mixed signals are comprised of respective carriers of different frequencies frequency modulated by at least one audio signal to constitute respective FM audio signals mixed with a video signal, comprising:

magnetic head means scanning substantially along adjacent first and second ones of said record tracks in succession for alternately reproducing said first and second mixed signals therefrom as said tape is advanced at a normal speed in a normal reproducing mode of the apparatus, said head means scanning imperfectly along said record tracks in another reproducing mode of the apparatus in which the tape is advanced at other than said normal speed so that said mixed signals are reproduced with noise particularly when said head means are situated adjacent end portions of the record tracks being imperfectly scanned thereby;

means for separating said FM audio signals from the respective reproduced mixed signals;

frequency-demodulating means receiving the FM audio signals separated from said reproduced mixed signals and demodulating therefrom respective alternately reproduced portions of said audio signal;

combining means for sequentially combining said alternately reproduced portions of the audio signal into a reconstituted audio signal; and means operative for removing from said reconstituted audio signal said noise which is reproduced with said mixed signals in said other reproducing mode.

2. An apparatus according to claim 1; in which said means for removing the noise in said other reproducing mode are made operative when said magnetic head means are situated adjacent end portions of the record tracks being imperfectly scanned thereby.

3. An apparatus according to claim 1; in which said means for removing the noise in said other reproducing mode includes muting means made operative for muting said reconstituted audio signal when said magnetic head means are situated adjacent end portions of the record tracks which are imperfectly scanned in said other reproducing mode.

4. An apparatus according to claim 1; in which said means for removing the noise in said other reproducing mode includes means for holding levels of said reconstituted audio signal, and means for replacing said reconstituted audio signal with a held level thereof when said magnetic head means are situated adjacent end portions of the record tracks which are imperfectly scanned in said other reproducing mode.

5. An apparatus according to claim 1; in which said means for removing the noise in said other reproducing mode includes means fr establishing a predetermined signal level, and means for replacing said reconstituted audio signal with said predetermined signal level when said magnetic head means are situated adjacent end portions of the record tracks which are imperfectly scanned in said other reproducing mode.

6. An apparatus according to claim 1; in which said means for removing the noise in said other reproducing mode includes means for detecting a level of noise in said reconstituted audio signal, and noise compensating means made operative whenever the detected noise level exceeds a predetermined threshold level.

7. An apparatus according to claim 6; in which said noise compensating means includes holding means for holding levels of said reconstituted audio signal, and means for replacing said sequentially combined portions of the audio signal with a level from said holding means when said detected noise level exceeds said threshold level.

8. An apparatus according to claim 7; in which said noise compensating means further includes muting means for muting noise included in said reconstituted audio signal, and selecting means responsive to the duration for which said detected noise level exceeds said threshold level for operating said holding means so long as said duration is less than a predetermined period and for operating said muting means when said duration exceeds said predetermined period.

9. An apparatus according to claim 8; in which said muting means includes a source of a predetermined signal level, and means effective to replace said reconstituted audio signal by said predetermined signal level on operation of said muting means.

10. An apparatus according to claim 6; in which said noise compensating means includes muting means operative to mute noise contained in said reconstituted audio signal, and means to cause operation of said muting means whenever said detected noise level exceeds said threshold level.

11. An apparatus according to claim 10; in which said muting means includes a source of a predetermined signal level which replaces said sequentially combined portions of the audio signal upon said operation of the muting means.

12. An apparatus according to claim 6; in which said means for detecting the noise level includes high pass filter means connected to the output of said combining means and having a cut-off frequency above an upper limit of the audio band so as to pass only high frequency noise, means for detecting the level of said high frequency noise, and comparator means for comparing the detected level of said high frequency noise with said threshold level and correspondingly actuating said noise compensating means.

13. An apparatus according to claim 1; further comprising drop-out compensating means responsive to drop-outs detected at random in at least portions of said reproduced mixed signals for providing corresponding corrections in said reconstituted audio signal.

14. An apparatus according to claim 13; in which said drop-out compensating means includes means for detecting said drop-outs at random in said FM audio signals separated from said reproduced mixed signals.

15. An apparatus according to claim 1; in which said head means includes first and second heads alternately moving across said record tape at the field period of said video signal, and a control signal is provided in synchronism with said alternate moving of said heads for identifying which of said first and second heads is scanning a track on the tape; and said means for removing noise from the reconstituted audio signal includes means for generating a noise suppression signal in response to said control signal in said other reproducing mode, said noise suppression signal having an operative level at the commencement and conclusion of the movement of each of said heads across the tape, and means for suppressing noise in said reconstituted audio signal in response to said opertive level of said noise suppression signal.

16. An apparatus according to claim 15; in which said means for generating said noise suppression signal includes switch means through which said control signal is supplied in said other reproducing mode, first and second delay means having different delay times and receiving said control signal from said switch means to provide first and second delayed control signals, and logic means combining said first and second delayed control signals into said noise suppression signal.

17. An apparatus according to claim 15; in which said tape is advanced at twice said normal speed in said other reproducing mode.

18. An apparatus according to claim 1; in which said first and second mixed signals are recorded with different azimuth angles in said first and second record tracks, respectively, and each of said record tracks contains a field interval of said video signal; and in which said head means includes first and second heads alternately moving across said record tape at field intervals of said video signal, said first and second heads having azimuth angles corresponding to said azimuth angles with which the mixed signals are recorded in said first and second record tracks, respectively.

19. An apparatus according to claim 18; in which, in said other reproducing mode, said tape is advanced intermittently at an aggregate speed slower than said normal speed so that said head means effects plural scans of each of said first record tracks and a single scan of each of said second record tracks; and in which said head means includes a third head having the same azimuth angle as said first head, and head selecting means operative in said other reproducing mode to cause said third head to operate in place of said second head during said plural scans of a first record track so that, in said other reproducing mode, said first and third heads alternately scan each first record track for repeated reproduction of the first mixed signal recorded therein and said second head reproduces the second mixed signal recorded in the adjacent second record track.

20. An apparatus according to claim 19; in which said means for separating said FM audio signals includes first and second band pass filter means for passing the frequency bands of the FM audio signals included in said first and second mixed signals, respectively, and filter selecting means synchronized with said head selecting means for selecting said first band pass filter means to receive the first mixed signal reproduced by said first or third head in said other reproducing mode and selecting said second band pass filter means to receive said second mixed signal when reproduced by said second head.

21. An apparatus according to claim 18; in which there are first, second, third and fourth of said carriers of successively increased frequencies, said first and second carriers are frequency modulated by a left stereophonic audio signal to form first and second of said FM audio signals, said third and fourth carriers are frequency modulated by a right stereophonic audio signal to form third and fourth of said FM audio signals, said first mixed signal is constituted by said first and third FM audio signals mixed with said video signal, and said second mixed signal is constituted by said second and fourth FM audio signals mixed with video signal; in which said frequency-demodulating means includes first, second, third and fourth demodulating means respectively receiving said first, second, third and fourth FM audio signals separated from the reproduced first and second mixed signals; and in which said combining means includes first switch means normally alternately delivering demodulated audio signals from said first and second demodulating means, and second switch means normally alternately delivering demodulated audio signals from said third and fourth demodulating means, each of said switch means being operated in synchronism with the alternate reproduction by said first and second heads of said first and second mixed signals from said first and second adjacent record tracks, respectively.

22. An apparatus according to claim 21; in which, in said other reproducing mode, said tape is advanced intermittently at an aggregate speed slower than said normal speed so that said head means effects plural scans of each of said first record tracks and a single scan of each of said second record tracks; and in which said head means includes a third head having the same azimuth angle as said first head, and head selecting means operative in said other reproducing mode to cause said third head to operate in place of said second head during said plural scans of each said first record track so that, in said other reproducing mode, said first and third heads alternately scan each said first record track for repeated reproduction of said first mixed signal recorded therein and said second head reproduces the second mixed signal recorded in the adjacent second record track.

23. An apparatus according to claim 22; in which said means for separating said FM audio signals includes first, second, third and fourth band pass filter means for passing the frequency bands of said first, second, third and fourth FM audio signals, respectively, said first and third pass band filter means being connected to said first head for receiving said first mixed signal reproduced by the latter, and filter selecting means synchronized with said head selecting means for selectively connecting said second head with said second and fourth band pass filter means so that the latter receive said second mixed signal reproduced by said second head and connecting said third head with said first and third band pass filter means when said third head is operative to reproduce said first mixed signal in said other reproducing mode.

24. An apparatus according to claim 23; in which each of said first and third band pass filter means includes a first section permanently connected to said first head and a second section connected through said filter selecting means to said third head only when said third head scans a first record track in said other reproducing mode, and each of said first and third demodulating means includes first and second sections connected to receive outputs of said first and second sections, respectively, of said first and third band pass filter means, respectively; and in which said combining means further includes supplemental switch means synchronized with said head selecting means in said other reproducing mode for supplying demodulated audio signals from said second sections of said first and third demodulating means to said first and second switch means in place of said demodulated audio signals from said second and fourth demodulating means.

25. In apparatus for recording and reproducing video and audio signals in successive parallel record tracks extending obliquely on a magnetic record tape:

the combination of recording circuit means comprising frequency-modulating means for modulating a plurality of carriers by an audio signal to be recorded and thereby providing respective FM audio signals, mixing means for mixing said FM audio signals with a video signal and thereby providing first and second mixed signals, respectively;

magnetic head means successively scanning along adjacent first and second ones of said successive record tracks on the record tape when the latter is advanced at a normal speed, said head means being operative, in a recording mode of the apparatus, to receive said first and second mixed signals for recording in said first and second adjacent record tracks, respectively, as the tape is advanced at said normal speed, said head means being operative, in a normal reproducing mode of the apparatus, to scan substantially along said first and second record tracks alternately as the tape is advanced at said normal speed for alternately reproducing said first and second mixed signals recorded in said first and second record tracks, respectively, said head means scanning imperfectly along said record tracks in another reproducing mode of the apparatus in which the tape is advanced at other than said normal speed so that said mixed signals are reproduced with noise particularly when said head means are situated near end portions of the record tracks being scanned imperfectly thereby; and reproducing circuit means comprising means for separating said FM audio signals from the reproducing mixed signals, frequency-demodulating means receiving the FM audio signals separated from said mixed signals and demodulating therefrom respective alternately reproduced portions of said audio signal, combining means for sequentially combining said alternately reproduced audio signal portions into a reconstituted audio signal, and means operative for removing from said reconstituted audio signal said noise which is reproduced with said mixed signals in said other reproducing mode.

26. An apparatus according to claim 25; in which said means for removing the noise in said other reproducing mode are made operative when said magnetic head means are situated adjacent end portions of the record tracks being imperfectly scanned thereby.

27. An apparatus according to claim 25; in which said means for removing the noise in said other reproducing mode includes muting means made operative for muting said reconstituted audio signal when said magnetic head means are situated adjacent end portions of the record tracks which are imperfectly scanned in said other reproducing mode.

28. An apparatus according to claim 25; in which said means for removing the noise in said other reproducing mode includes means for holding levels of said reconstituted audio signal, and means for replacing said reconstituted audio signal with a held level thereof when said magnetic head means are situated adjacent end portions of the record tracks which are imperfectly scanned in said other reproducing mode.

29. An apparatus according to claim 25; in which said means for removing the noise in said other reproducing mode includes means for establishing a predetermined signal level, and means for replacing said reconstituted audio signal with said predetermined signal level when said magnetic head means are situated adjacent end portions of the record tracks which are imperfectly scanned in said other reproducing mode.

30. An apparatus according to claim 25; in which said means for removing the noise in said other reproducing mode includes means for detecting a level of noise in said reconstituted audio signal, and noise compensating means made operative whenever the detected noise level exceeds a predetermined threshold level.

31. An apparatus according to claim 30; in which said noise compensating means includes holding means for holding levels of said reconstituted audio signal, and means for replacing said reconstituted audio signal with a level from said holding means when said detected noise level exceeds said threshold level.

32. An apparatus according to claim 31; in which said noise compensating means further includes muting means for muting noise included in said reconstituted audio signal, and selecting means responsive to the duration for which said detected noise level exceeds said threshold level for operating said holding means so long as said duration is less than a predetermined period and for operating said muting means when said duration exceeds said predetermined period.

33. An apparatus according to claim 32; in which said muting means includes a source of a predetermined signal level, and means effective to replace said reconstituted audio signal by said predetermined signal level on operation of said muting means.

34. An apparatus according to claim 30; in which said noise compensating means includes muting means operative to mute noise contained in said reconstituted audio signal, and means to cause operation of said muting means whenever said detected noise level exceeds said threshold level.

35. An apparatus according to claim 34; in which said muting means includes a source of a predetermined signal level which replaces said reconstituted audio signal upon said operation of the muting means.

36. An apparatus according to claim 30; in which said means for detecting the noise level includes high pass filter means connected to the output of said combining means and having a cut-off frequency above an upper limit of the audio band so as to pass only high frequency noise, means for detecting the level of said high frequency noise, and comparator means for comparing the detected level of said high frequency noise with said threshold level and correspondingly actuating said noise compensating means.

37. An apparatus according to claim 25; further comprising drop-out compensating means responsive to drop-outs detected at random in at least portions of said reproduced mixed signals for providing corresponding corrections in said reconstituted audio signal.

38. An apparatus according to claim 37; in which said drop-out compensating means includes means for detecting said drop-outs at random in said FM audio signals separated from said reproduced mixed signals.

39. An apparatus according to claim 25; in which said head means includes first and second heads alternately moving across said record tape at the field period of said video signal, and a control signal is provided in synchronism with said alternate moving of said heads for identifying which of said first and second heads is scanning a track on the tape; and said means for removing noise from the reconstituted audio signal includes means for generating a noise suppression signal in response to said control signal in said other reproducing mode, said noise suppression signal having an operative level at the commencement and conclusion of the movement of each of said heads across the tape, and means for suppressing noise in said reconstituted audio signal in response to said operative level of said noise suppression signal.

40. An apparatus according to claim 39; in which said means for generating said noise suppression signal includes switch means through which said control signal is supplied in said other reproducing mode, first and second delay means having different delay times and receiving said control signal from said switch means to provide first and second delayed control signals, and logic means combining said first and second delayed control signals into said noise suppression signal.

41. An apparatus according to claim 39; in which said tape is advanced at twice said normal speed in said other reproducing mode.

42. An apparatus according to claim 25; in which said head means includes first and second heads alternately moving across said record tape at field intervals of said video signal, and said first and second heads have different azimuth angles with which field intervals of said first and second mixed signals are recorded in said first and second record tracks, respectively.

43. An apparatus according to claim 42; in which, in said other reproducing mode, said tape is advanced intermittently at an aggregate speed slower than said normal speed so that said head means effects plural scans of each of said first record tracks and a single scan of each of said second record tracks; and in which said head means includes a third head having the same azimuth angle as said first head, and head selecting means operative in said other reproducing mode to cause said third head to operate in place of said second head during said plural scans of a first record track so that, in said other reproducing mode, said first and third heads alternately scan each first record track for repeated reproduction of the first mixed signal recorded therein and said second head reproduces the second mixed signal recorded in the adjacent second record track.

44. An apparatus according to claim 43; in which said means for separating said FM audio signals includes first and second band pass filter means for passing the frequency bands of the FM audio signals included in said first and second mixed signals, respectively, and filter selecting means synchronized with said head selecting means for selecting said first band pass filter means to receive the first mixed signal reproduced by said first or third head in said other reproducing mode and selecting said second band pass filter means to receive said second mixed signal when reproduced by said second head.

45. An apparatus according to claim 42; in which there are first, second, third and fourth of said carriers of successively increased frequencies, said first and second carriers are frequency modulated by a left stereophonic audio signal to form first and second of said FM audio signals, said third and fourth carriers are frequency modulated by a right stereophonic audio signal to form third and fourth of said FM audio signals, said first mixed signal is constituted by said first and third FM audio signals mixed with said video signal, and said second mixed signal is constituted by said second and fourth FM audio signals mixed with said video signal; in which said frequency-demodulating means includes first, second, third and fourth demodulating means respectively receiving said first, second, third and fourth FM audio signals separated from the reproduced first and second mixed signals; and in which said combining means includes first switch means normally alternately delivering demodulated audio signals from said first and second demodulating means, and second switch means normally alternately delivering demodulated audio signals from said third and fourth demodulating means, each of said switch means being operated in synchronism with the alternate reproduction by said first and second heads of said first and second mixed signals from said first and second adjacent tracks, respectively.

46. An apparatus according to claim 45; in which, in said other reproducing mode, said tape is advanced intermittently at an aggregate speed slower than said normal speed so that said head means effects plural scans of each of said first record tracks and a single scan of each of said second record tracks; and in which said head means includes a third head having the same azimuth angle as said first head, and head selecting means operative in said other reproducing mode to cause said third head to operate in place of said second head during said plural scans of each said first record track so that, in said other reproducing mode, said first and third heads alternately scan each said first record track for repeated reproduction of said first mixed signal recorded therein and said second head reproduces the second mixed signal recorded in the adjacent second record track.

47. An apparatus according to claim 46; in which said means for separating said FM audio signals includes first, second, third and fourth band pass filter means for passing the frequency bands of said first, second, third and fourth FM audio signals, respectively, said first and third pass band filter means being connected to said first head for receiving said first mixed signal reproduced by the latter, and filter selecting means synchronized with said head selecting means for selectively connecting said second head with said second and fourth band pass filter means so that the latter receive said second mixed signal reproduced by said second head and connecting said third head with said first and third band pass filter means when said third head is operative to reproduce said first mixed signal in said other reproducing mode.

48. An apparatus according to claim 47; in which each of said first and third band pass filter means includes a first section permanently connected to said first head and a second section connected through said filter selecting means to said third head only when said third head scans a first record track in said other reproducing mode, and each of said first and third demodulating means includes first and second sections connected to receive outputs of said first and second sections, respectively, of said first and third band pass filter means, respectively; and in which said combining means further includes supplemental switch means synchronized with said head selecting means in said other reproducing mode for supplying demodulated audio signals from said second sections of said first and third demodulating means to said first and second switch means in place of said demodulated audio signals from said second and fourth demodulating means.

* * * * *